United States Patent

Otto et al.

[11] Patent Number: 5,782,327
[45] Date of Patent: Jul. 21, 1998

[54] HYDROKINETIC TORQUE CONVERTER AND LOCKUP CLUTCH THEREFOR

[75] Inventors: Dieter Otto, Achern-Oberachern; Volker Middlemann, Bühl-Altschweier, both of Germany

[73] Assignee: Luk Getriebe-Systeme GmbH, Bühl, Germany

[21] Appl. No.: 649,065

[22] Filed: May 16, 1996

Related U.S. Application Data

[63] Continuation of Ser. No. 272,920, Jul. 8, 1994, abandoned.

[30] Foreign Application Priority Data

Jul. 9, 1993 [DE] Germany ................. 43 22 971.3
May 25, 1994 [DE] Germany ................. 44 18 024.1

[51] Int. Cl.[6] ........................................... F16H 45/02
[52] U.S. Cl. .................................. 192/3.29; 192/113.36
[58] Field of Search .................... 192/3.28, 3.29, 192/3.3, 3.31, 113.36, 66.2; 477/57, 64

[56] References Cited

U.S. PATENT DOCUMENTS

| | | | |
|---|---|---|---|
| 2,749,264 | 6/1956 | Emrick | 192/66.2 X |
| 3,977,502 | 8/1976 | Chana | 477/64 X |
| 4,267,912 | 5/1981 | Bauer et al. | 192/107 M X |
| 4,423,803 | 1/1984 | Malloy | 192/3.29 |
| 4,438,665 | 3/1984 | Schmidt | 477/64 X |
| 4,441,385 | 4/1984 | Taga et al. | 477/64 X |
| 4,445,599 | 5/1984 | Bopp | 192/3.29 |
| 4,493,406 | 1/1985 | Bopp | 192/58 B |
| 4,580,668 | 4/1986 | Pickard et al. | 192/3.29 |
| 4,649,763 | 3/1987 | Graef et al. | 74/763 |
| 4,674,616 | 6/1987 | Mannino | 192/113.36 |
| 4,969,513 | 11/1990 | MacDonald | 192/3.28 |
| 5,056,631 | 10/1991 | MacDonald | 192/3.29 |
| 5,248,016 | 9/1993 | Umezawa | 192/3.28 |
| 5,310,033 | 5/1994 | Shibayama | 192/3.29 |
| 5,385,222 | 1/1995 | Otto et al. | 192/3.29 |

FOREIGN PATENT DOCUMENTS 971639  9/1964  United Kingdom .............. 192/3.29

*Primary Examiner*—Rodney H. Bonck
*Attorney, Agent, or Firm*—Darby & Darby

[57] ABSTRACT

A hydrokinetic torque converter is provided with a lockup clutch wherein the piston and other constituents of the lockup clutch are adequately cooled during each stage of operation of the torque converter and its clutch. The piston of the lockup clutch and/or the component which cooperates with the piston to transmit torque from the housing directly to the turbine of the torque converter is provided with a friction lining which establishes a portion of the path for the flow of fluid coolant between the fluid-filled compartments at opposite sides of the piston. The rate of fluid flow between the compartments is regulated by one or more adjustable valves which are carried by the housing of the torque converter and/or by the piston of the lockup clutch.

156 Claims, 8 Drawing Sheets

HYDROKINETIC TORQUE CONVERTER AND LOCKUP CLUTCH THEREFOR

This is a continuation of application Ser. No. 08/272,920, filed Jul. 8, 1994, and now abandoned.

BACKGROUND OF THE INVENTION

The invention relates to improvements in hydrokinetic torque converters and to improvements in lockup clutches or bypass clutches for use in torque converters. More particularly, the invention relates to improvements in torque converters of the type wherein a rotary housing is provided with a chamber for a pump, a turbine, a stator and a lockup clutch having an axially movable annular piston which divides the chamber into a first compartment and a second compartment. The chamber is filled with a suitable fluid (such as oil), and the piston of the lockup clutch carries a first friction surface which can be moved into torque transmitting contact with a second friction surface when the lockup clutch is engaged. Still more particularly, the invention relates to improvements in hydrokinetic torque converters and lockup clutches wherein the first compartment is disposed between the piston and a component which carries the second friction surface, and wherein the piston and/or the aforementioned component is provided with one or more passages to establish a path for the flow of fluid from the second compartment substantially radially inwardly toward the rotational axis of the housing.

European Pat. No. 0 078 651 discloses a torque converter having a lockup clutch which includes an annular piston. That side of the piston which faces away from the friction surfaces is provided with channels serving to establish paths for the flow of fluid between a first compartment which is bounded a radial wall of the housing and the piston, and the second compartment which confines the pump and the turbine of the torque converter. The direction of fluid flow is from the second compartment into the first compartment so that the fluid can cool a viscous coupling which transmits torque between the piston and the hub of the turbine.

U.S. Pat. No. 4,969,543 (granted Nov. 13, 1990 to Macdonald for "Slipping Bypass Clutch Construction for a Hydrokinetic Torque Converter") discloses a lockup clutch having an annular piston provided with a first friction surface movable against a second friction surface provided on a radially extending wall of the housing. The piston or the friction lining on the wall of the housing is provided with channels which permit a fluid to flow from the second compartment into the first compartment within the housing even when the lockup clutch is engaged. The channels are provided at the same radial distance from the rotational axis of the housing as the friction surfaces, the first compartment is disposed between the piston and the wall of the housing, and the second compartment accommodates at least the turbine of the torque converter. The patentee desires to prevent excessive thermal stressing of certain parts of the torque converter such as could develop during continuous slipping of the friction surfaces during operation of the torque converter. More specifically, the patentee desires to prevent excessive thermal stressing of parts in the region of the two friction surfaces.

Published Japanese patent application No. 58-30532 also discloses a lockup clutch or bypass clutch which is intended for use in a hydrokinetic torque converter and is provided with channels in the region of its friction surfaces.

The aforementioned patent to Macdonald is but one of numerous publications which propose the utilization of a lockup clutch whose friction surfaces slide relative to each other in the disengaged as well as in the engaged condition of the clutch. If the torque converter is installed in the power train of a motor vehicle, the slippage of the friction surfaces forming part of the lockup clutch can be short-lasting (e.g., during shifting into a different gear) or such slippage can be maintained practically within the entire operating range of the torque converter. The extent and the duration of slippage can depend upon the design of the prime mover which drives the housing of the torque converter and/or upon the selected gear ratio and/or upon one or more variable parameters of the prime mover. The lockup clutch dissipates energy in the form of heat during slippage of its friction surfaces relative to each other, and the quantity of dissipated energy can be quite pronounced (e.g., in the range of several kilowatts) during certain stages of operation of the torque converter. Such a situation can develop, for example, when a vehicle pulling a trailer is driven along a mountain road, i.e., the torque converter is apt to dissipate large amounts of energy for an extended period of time. Moreover, when the slip clutch is engaged, the amount of dissipated energy can be greatly increased, at least for a short interval of time, i.e., the torque converter and its lockup clutch are apt to be heated well above a permissible maximum temperature.

The purpose of the establishment of one or more paths for the flow of a fluid coolant is to eliminate the aforediscussed drawbacks of heretofore known torque converters and their lockup clutches. A drawback of heretofore known proposals to cool the lockup clutch of a torque converter is that the maximum torque which the lockup clutch can transmit is insufficient, and this is attributable to certain dynamic or kinetic conditions which develop in the fluid flow. The ability of conventional lockup clutches to transmit torque decreases in response to an increasing RPM of the housing of the torque converter as well as in response to increasing rate of fluid flow. This means that, if only the lockup clutch of a heretofore known torque converter is to transmit torque when the RPM of the housing rises to a preselected value, it is necessary to increase the system pressure accordingly. This, in turn, renders it necessary to employ stronger parts, such as a stronger and bulkier piston as well as a higher-capacity pump. Furthermore, the rate of fluid flow per unit of time is then increased again which results in additional losses.

The aforementioned reduction of the ability of the lockup clutches in conventional torque converters to transmit torque is attributable, among other causes, to the development of forces generated as a result of certain dynamic conditions acting upon the radially inwardly flowing fluid in a sense to increase the fluid pressure. Such forces generate a component acting in the direction of the rotational axis of the housing of the torque converter so that the piston is urged to move in a sense to disengage the lockup clutch.

A further drawback of heretofore known undertakings to cool the torque converter in the region of the lockup clutch is that the flow of cooling fluid is overly dependent upon the temperature and/or viscosity of the fluid (such as oil) and/or the difference between fluid pressures at opposite sides of the piston. This means that, if a torque converter and its lockup clutch are constructed and assembled in a manner as proposed, for example, in the aforementioned patent to Macdonald, the resistance to the flow of fluid in the channels between the two fluid-containing compartments must be selected to be satisfactory even under critical circumstances, i.e., the rate of flow of fluid whose temperature has risen to a maximum possible or permissible value is less than the rate at which the system pressure in the torque converter would drop or collapse to an unacceptably low value. In the patented torque converter of Macdonald, the rate of fluid flow in the channels between the two compartments at opposite sides of the piston of the lockup clutch is directly dependent upon the difference between the fluid pressures in the two compartments. Such pressure differential is the variable parameter which controls the transmission of torque by the lockup clutch and, therefore, it cannot be resorted to for the selection of the desired volumetric flow of the fluid. Thus, and in order to maintain the losses in the torque converter above a minimum acceptable value, the rate of fluid flow must be low even when the difference between the fluid pressures in the two compartments rises to a maximum value, i.e., when the converter is called upon to transmit a maximal torque. This may ensure a satisfactory rate of the flow of fluid coolant when the converter is called upon to transmit maximum torque but is unsatisfactory during transmission of lesser torque because the difference between the fluid pressures in the two compartments of the torque converter is too low.

OBJECTS OF THE INVENTION

An object of the present invention is to provide a novel and improved torque converter which is capable of transmitting large torques.

Another object of the invention is to provide a hydrokinetic torque converter which can transmit large torques without risking an overheating of its constituents.

A further object of the invention is to provide a conveyance wherein the power train embodies the improved hydrokinetic torque converter.

Still another object of the invention is to provide a torque converter with a lockup clutch or bypass clutch which is constructed and assembled in such a way that it is adequately cooled in the region of its friction surfaces.

A further object of the invention is to provide a torque converter wherein the fluid is not overheated irrespective of the prevailing conditions.

Another object of the invention is to provide a hydrokinetic torque converter wherein the rate of fluid flow in the region of the lockup clutch is not only acceptable but rather highly satisfactory irrespective of the circumstances of use of the torque converter and its lockup clutch.

An additional object of the invention is to enhance the exchange of heat between the parts of the lockup clutch in a hydrokinetic torque converter and a fluid coolant.

Still another object of the invention is to provide a lockup clutch or bypass clutch which is installed in a hydrokinetic torque converter and is constructed and assembled in such a way that the magnitude of torque which the clutch is to transmit can be selected and varied with utmost precision.

A further object of the invention is to provide a lockup clutch or bypass clutch which can be utilized in a hydrokinetic torque converter and is constructed and assembled in such a way that the extent of slippage between its friction surfaces can be regulated with a heretofore unknown degree of precision.

Another object of the invention is to provide a lockup clutch which can be installed in the housing of a hydrokinetic torque converter and wherein the slippage between the friction surfaces can be selected with a view to satisfactorily compensate for surges and/or other irregularities of torque transmission regardless of whether the irregularities are attributable to the prime mover which drives the housing of the torque converter and/or to the power train between the prime mover and the housing.

An additional object of the invention is to enhance the comfort of the occupant or occupants of a motor vehicle wherein the power train between the prime mover and the wheels embodies a hydrokinetic torque converter and a lockup clutch or bypass clutch of the above-outlined character.

Still another object of the invention is to provide novel and improved means for regulating the rate of fluid flow between compartments at opposite sides of the piston in a lockup clutch which is embodied in a hydrokinetic torque converter.

A further object of the invention is to provide novel and improved piston or pressure plate for use in a lockup clutch of the above-outlined character.

Another object of the invention is to provide novel and improved friction linings for use in the lockup clutches of hydrokinetic torque converters.

An additional object of the invention is to provide a novel and improved housing for use in a hydrokinetic torque converter.

Still another object of the invention is to provide a novel and improved lockup clutch or bypass clutch which can be utilized in a hydrokinetic torque converter and whose operation can be regulated to conform to one or more variable parameters of the torque converter, of the means for driving the torque converter and/or of means receiving torque from the torque converter.

A further object of the invention is to provide a simple, compact and inexpensive torque converter and a simple, compact and inexpensive lockup clutch or bypass clutch for use in such torque converter.

Another object of the invention is to provide a novel and improved method of establishing, dimensioning and orienting fluid flow permitting passages and/or channels in the regions of the friction surfaces in a lockup clutch or bypass clutch for use in hydrokinetic torque converters.

An additional object of the invention is to provide a lockup clutch which can be utilized in the above-outlined novel and improved hydrokinetic torque converter and even in certain types of conventional torque converters.

Still another object of the invention is to provide a lockup clutch wherein the piston or pressure plate can perform one or more important functions in addition to that of engaging and disengaging the clutch.

SUMMARY OF THE INVENTION

One feature of the present invention resides in the provision of a hydrokinetic torque converter which comprises a housing which is rotatable about a predetermined axis and is provided with a fluid-containing chamber for the pump, turbine and stator of the torque converter. The latter further comprises a novel and improved engageable and disengageable lockup clutch or bypass clutch which is interposed between the housing and the turbine and comprises an annular piston movable in the chamber in the direction of the predetermined axis and dividing the chamber into a first compartment which is disposed at a first radial distance from the axis and a second compartment. The lockup or bypass clutch (hereinafter called lockup clutch or clutch for short) comprises a first friction surface which is (directly or indirectly) carried by the piston at a second radial distance from the axis greater than the first radial distance and a second friction surface carried by a component which is rotatable with the housing. The first friction surface confronts and is in contact with the second friction surface in the engaged condition of the clutch, and the piston and/or the component has at least one passage for the flow of fluid from the second compartment substantially radially inwardly toward the first compartment. The clutch further comprises first and second members which define at least one channel serving to establish a path for the flow of fluid from the at least one passage into the first compartment and wherein the fluid acts upon the first and/or the second member in the direction of the predetermined axis. Still further, the clutch comprises means for preventing axial movements of the piston in the direction of the predetermined axis in response to the action of the fluid in the at least one channel. Otherwise stated, the first and second members are propped or held relative to each other in the direction of the predetermined axis in such a way that the power flow between them is an endless (closed in itself) flow.

The piston of the lockup clutch is preferably provided with at least one friction lining and the first friction surface is then provided on the at least one friction lining. Furthermore, the first or second member can form part of the piston, i.e., the piston can define the at least one channel jointly with the second or first member. Otherwise stated, one of the first and second members can form part of the piston.

The orientation of the at least one passage can be such that it establishes a path for the flow of fluid from the second compartment toward the first compartment.

The means for preventing axial movements of the piston in the direction of the predetermined axis in response to the action of fluid in the at least one channel can include means for connecting the first and second members to each other.

In accordance with a presently preferred embodiment, one of the first and second members bounds a portion of the first compartment and is affixed to the aforementioned component or to the piston, and the at least one channel is then provided in the one member.

One of the first and second members can be rigid with (e.g., riveted to or of one piece with) the piston or the component.

The component can include or constitute or form part of a wall which, in turn, forms part of the housing and extends substantially radially of the predetermined axis. The first compartment is disposed between the wall and the piston, as seen in the direction of the predetermined axis.

The piston can be installed between a wall of the housing and the turbine of the torque converter.

If one of the first and second members forms part of the piston, the at least one channel can be provided in the piston.

It is also possible to mount the first or second member on the piston, and the first or the second member can be disposed in the first compartment of the chamber in the housing of the torque converter.

The piston can be disposed in the housing between one of the first and second members and the first compartment.

The pump and the turbine of the torque converter are installed in the second compartment. One of the first and second members can divide the first compartment into two sections which are adjacent each other as seen in the direction of the predetermined axis.

At least one friction lining can be provided on the aforementioned component and/or on the piston. The at least one passage is then adjacent the friction lining, and such passage can be provided in the friction lining.

The inlet of the at least one passage can be disposed at a first radial distance from the predetermined axis, and the outlet of such passage can be disposed at a lesser or shorter second radial distance from the axis.

The width of the first compartment (as measured radially of the predetermined axis) can be selected in such a way that its exceeds the length of the at least one channel. It is presently preferred to select the ratio of the width of the first compartment to the length of the at least one channel in such a way that the length of the channel is not less than 50% of the width of the first compartment.

The at least one passage can constitute a cutout in, or is stamped or embossed into, the friction lining on or of the aforementioned component and/or the piston.

The inlet of the at least one passage can be substantially parallel with the predetermined axis, and such inlet can be provided in the aforementioned component and/or in the piston. Furthermore, the outlet of the at least one passage can be substantially parallel with the predetermined axis and can be provided in the piston and/or in the aforementioned component.

The at least one passage in the friction lining on the component and/or on the piston can be configurated in such a way that it establishes a substantially meandering or zig-zag shaped path for the flow of fluid (e.g., oil) between the at least one channel and the second compartment.

If the piston is provided with at least one friction lining having a first portion disposed at a lesser first radial distance and a second portion disposed at a greater second radial distance from the predetermined axis, the at least one passage can be provided in the at least one friction lining in such a way that it has an inlet at least close to one of the first and second portions of the at least one friction lining and an outlet which is at least close to the other of the first and second portions of the at least one friction lining.

The at least one friction lining of the annular piston defines the respective friction surface and can extend substantially circumferentially of the piston. The at least one passage can be provided, at least in part, in the friction lining to extend substantially circumferentially of the piston and to define a substantially meandering or zig-zag shaped path for the flow of fluid between the at least one channel and the second compartment.

If the at least one passage establishes a substantially meandering or zig-zag shaped path for the flow of fluid between the second compartment and the at least one channel, the configuration of the passage is or can be such that it includes at least two turns, i.e., the fluid flowing therein is compelled to change the direction of flow more than once.

As already mentioned above, the piston can comprise or carry at least one friction lining, and the respective friction surface is then provided on such friction lining.

The friction lining of the aforementioned component or of the piston is provided with the respective friction surface, and such friction lining can comprise or can be composed of at least two arcuate sections.

In accordance with another feature of the invention, the lockup clutch can further comprise means for regulating the flow of fluid in the at least one passage as a function of variations of at least one variable parameter of the torque converter. The arrangement can be such that the regulating means controls the flow of fluid in the at least one passage in dependency upon variations of at least one variable parameter of the torque converter and/or as a function of at least one variable parameter of the means (e.g., a combustion engine in a motor vehicle) for driving the housing of the torque converter and/or as a function of at least one variable parameter of the means for receiving torque from the turbine of the torque converter. For example, the torque converter can transmit torque to an automatic transmission in a motor vehicle.

The means for regulating the flow of fluid in the at least one passage can constitute or include an adjustable valve which is installed at the inlet or at the outlet of the at least one passage. Such passage can be defined by a suitably shaped portion of the aforementioned component and/or the piston. The component can constitute a wall, and the at least one passage (or at least one of plural passages) can be defined by a suitably shaped portion of such wall. For example, the at least one passage can be provided in the annular piston, and at least one additional passage can be provided in the piston or in the aforementioned component (such as a wall of the housing).

The valve or any other suitable fluid flow regulating means can be designed in such a way that it includes means for regulating the flow of fluid through the at least one passage to ensure that the rate of fluid flow through the passage is at least substantially constant within the entire operating range of the torque converter.

The pressure of fluid in the first compartment can differ or differs from the fluid pressure in the second compartment during at least one stage of operation of the torque converter, for example, when such torque converter is installed in the power train of a motor vehicle. The aforementioned valve or equivalent means for regulating the flow of fluid in the at least one passage is then designed to regulate the fluid flow as a function of differences between the fluid pressures in the two compartments. The valve is designed to reduce the rate of fluid flow in the at least one passage in response to increasing differences between the fluid pressures in the two compartments.

If the valve is acted upon by centrifugal force in response to rotation of the aforementioned component and/or the piston, it is preferably provided with (or the lockup clutch further comprises) means for varying the rate of fluid flow in the at least one passage as a function of changes of differences between fluid pressures in the first and second compartments and at least substantially independently of the action of centrifugal force.

It has been found that the rate of fluid flow in the at least one passage is quite satisfactory if such rate is different from the square root of the difference between fluid pressures in the first and second compartments.

Another feature of the invention resides in the provision of a hydrokinetic torque converter which comprises (1) a housing having a fluid-containing chamber which is rotatable about a predetermined axis, (2) a pump, (3) a turbine and (4) a stator in the chamber, and (5) an engageable and disengageable lockup clutch which is interposed between the housing and the turbine. The clutch comprises an annular piston movable in the chamber in the direction of the predetermined axis and dividing the chamber into a first compartment and a second compartment. The clutch further comprises a first friction surface which is provided on at least one friction lining of the annular piston, and a second friction surface carried by a component which is rotatable with the housing and serves to confront and contact the first friction surface in the engaged condition of the clutch. The friction surfaces are disposed at a first radial distance from the predetermined axis, and the first compartment is disposed at a lesser second radial distance from such axis. The piston and/or the component is provided with at least one passage for the flow of fluid from the second compartment toward the first compartment in the engaged condition of the clutch, and such passage is disposed at the aforementioned first radial distance from the predetermined axis. The clutch further comprises a wall which is disposed in the first compartment and extends substantially radially of the predetermined axis to define with a second wall at least one channel which establishes a path for the flow of fluid from the at least one passage into the first compartment, and means for connecting the walls to each other against movement relative to one another in the direction of the predetermined axis. The second wall preferably extends at least substantially radially of the predetermined axis.

The second wall can form part of the piston, and the clutch can further comprise means for connecting the first wall to the housing against movement relative to the housing in the direction of the predetermined axis. Still further, the torque converter or its clutch can comprise means for connecting the first wall to the hub of the turbine so that the first wall is held against movement relative to the turbine in the direction of the predetermined axis.

Still another feature of the invention resides in the provision of a novel and improved lockup clutch for use in a hydrokinetic torque converter and comprising a friction lining having at least one friction surface and at least one passage for the flow of a fluid coolant (e.g., oil). The at least one passage is disposed at the at least one friction surface. The ratio of the thickness of the friction lining to the average depth of the at least one passage can be between 1.3 and 2.7. The depth of the at least one passage can be in the range between 0.2 and 0.8 mm, preferably between 0.3 and 0.6 mm.

If the torque converter which embodies the improved lockup clutch is installed in a motor vehicle, the fluid coolant is or can be heated when the vehicle is in actual use, and the at least one passage is or can be configurated in such a way that it ensures the developement of a turbulent coolant flow at its inlet and/or at its outlet when the vehicle is in actual use.

The at least one passage of the improved lockup clutch can extend in the circumferential direction of an annular piston which forms part of the clutch and carries the friction lining. The at least one passage can establish for the fluid coolant a path which is an at least substantially meandering or zig-zag shaped path, and the at least one passage can have an at least substantially constant cross-sectional outline between its inlet and its outlet. The friction lining which defines a substantially meandering or zig-zag shaped path can have a substantially circular shape.

If the improved clutch is embodied in a torque converter having at least one variable operational parameter and being driven by a prime mover (e.g., a combustion engine having one or move variable parameters) to transmit torque to an automatic transmission or another torque receiving unit having one or more variable parameters, the clutch can be further provided with means (e.g., one or more valves or flow restrictors) for regulating the flow of fluid coolant in the at least one passage as a function of variations of at least one of the aforementioned parameters.

BRIEF DESCRIPTION OF THE DRAWINGS

The novel features which are considered as characteristic of the invention are set forth in particular in the appended claims. The improved torque converter itself, however, both as to its construction and its mode of operation, together with additional features and advantages thereof, will be best understood upon review of the following detailed description of certain presently preferred specific embodiments with reference to the accompanying drawings, wherein:

FIG. 9 is an enlarged axial sectional view of the fluid flow regulating means of the lockup clutch shown in FIG. 8a;

DESCRIPTION OF PREFERRED EMBODIMENTS

Figure 1:
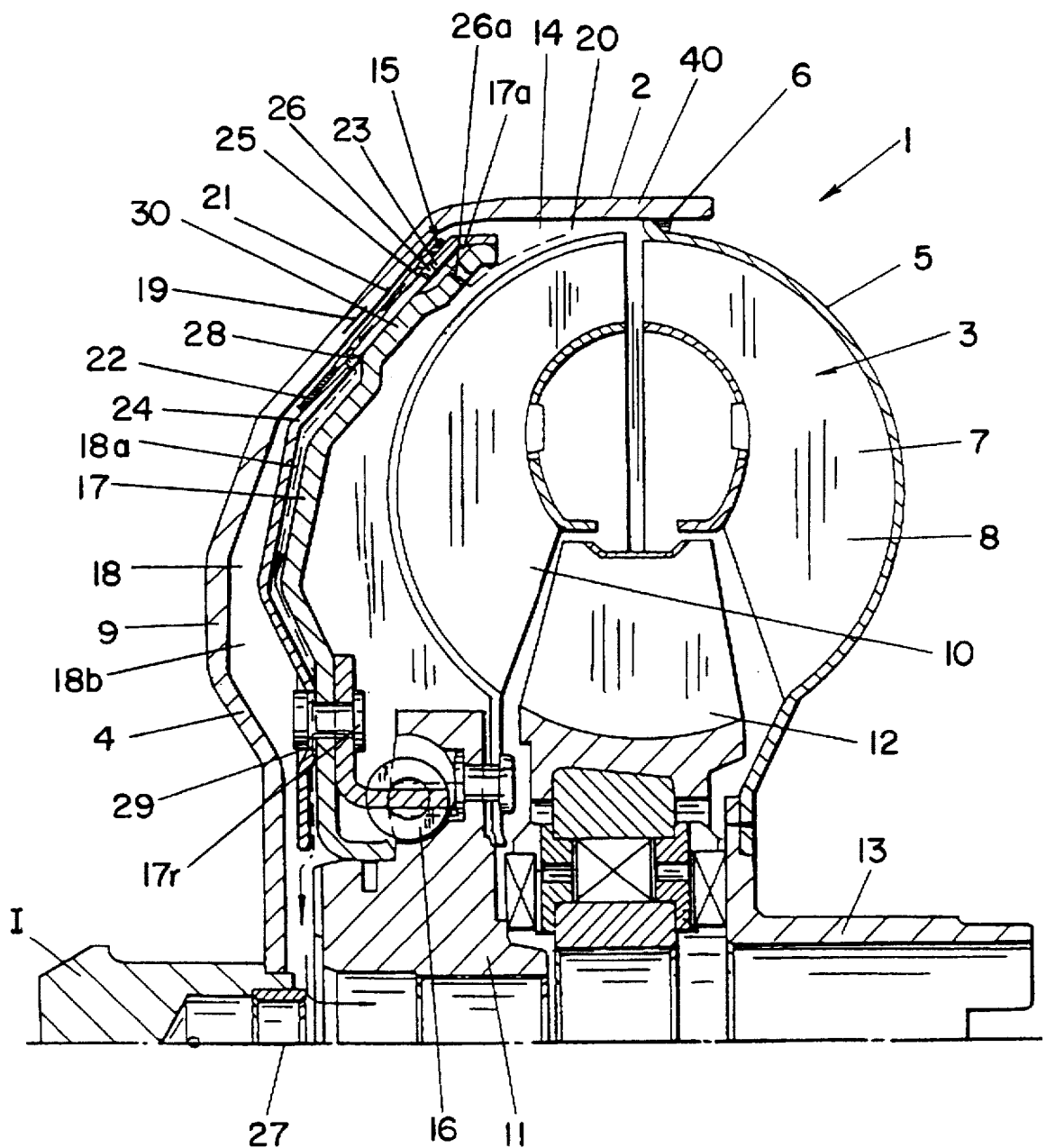
FIG. 1 is a fragmentary axial sectional view of a hydrokinetic torque converter and of a lockup clutch which embody one form of the present invention.

FIG. 1 shows a portion of an apparatus 1 which can be utilized for the transmission of torque from a prime mover (e.g. the internal combustion engine of a motor vehicle) to one or more driven units, e.g., to the differential for the wheels of a motor vehicle. The apparatus 1 comprises a torque converter 3 having a housing 2 which defines a chamber for a pump 7, a turbine 10, a stator 12 and a lockup clutch 15. The torque converter 3 forms part of the power train and can be installed and assembled with other constituents of the power train in a manner as disclosed, for example, in FIG. 1 of U.S. Pat. No. 4,493,406 granted Jan. 15, 1985 to Bopp for "Viscous Bypass Coupling For Torque Converter". The disclosure of the patent to Bopp is incorporated herein by reference.

The housing 2 of the torque converter 3 comprises two annular portions or sections 4 and 5 which are sealingly secured to each other by a welded seam 6. Such seam is provided between the radially outermost part of the housing section 5 and an axially extending cylindrical part 4a of the section 4. The section 4 can receive torque from a rotary input element I of the prime mover, e.g., the camshaft or the crankshaft of a combustion engine. FIG. 1 shows that the radially inner part of a substantially radially extending wall 9 of the housing section 4 is directly connected to the output element I; however, it is equally possible to employ an intermediate part, e.g., a washer-like sheet metal connector which is interposed and transmits torque between the output element I and the housing section 4. The radially inner portion of such connector is affixed to the output element I and the radially outer portion of the connector is affixed to the section 4 of the housing 2. Reference may be had, for example, to the aforementioned published Japanese patent application No. 58-30532.

The section or portion 5 of the housing 2 which is shown in FIG. 1 performs the additional function of constituting the casing or shell of the pump 7. The vanes or blades 8 of the pump 7 are affixed directly to the section 5. The turbine 10 is installed in the chamber of the housing 2 between the pump 7 and the substantially radially extending wall 9 of the housing section 4. The radially inner portion of the turbine 10 is non-rotatably affixed to or is of one piece with a tubular hub 11. This hub is provided with axially parallel internal splines which alternate with teeth and can receive the complementary teeth at the exterior of the rotary input element of a unit which is to receive torque from the torque converter 3. For example, the hub 11 can transmit torque to the rotary input shaft of a gear ratio box as shown in FIG. 1 of the aforementioned patent to Bopp.

The stator 12 of the torque converter 3 is installed in the chamber of the housing 2 between the radially inner portions of the pump 7 and turbine 10. The radially inner portion of the housing section 5 is connected to or provided with a sleeve-like hub 13 which can be rotatably mounted in the case of a transmission.

The aforementioned internal chamber of the housing 2 is shown at 14. The left-hand portion of this chamber receives the lockup clutch 15 which, when engaged, can transmit torque directly between the housing section 4 and the hub 11 of the turbine 10. The lockup clutch 15 is designed and mounted in such a way that it operates in parallel with the torque converter 3. The chamber 14 further accommodates a damper 16 which operates in series with the torque converter 3 and can include a set of arcuate coil springs or other suitable energy storing elements which can transmit torque from the annular piston or pressure plate 17 of the lockup clutch 15 directly to the hub 11 of the turbine 10 when the lockup clutch is engaged. Reference may be had, for example, to U.S. Pat. No. 5,156,249 (granted Oct. 20, 1992 to Friedmann for "Torque Transmitting Apparatus With Axially Deformable Primary Flywheel") which is assigned to the owner of the assignee of the present application.

The piston or pressure plate 17 (hereinafter called piston or annular piston) is installed in the chamber 14 at the wall 9 of the housing section 4, and the radially inner portion of this piston has limited freedom of movement relative to the hub 11 of the turbine 10 in the directions of the axis 27 of the housing 2. The piston 17 divides the chamber 14 into a first compartment 18 adjacent the wall 9 and a second compartment 20 which contains the pump 7, the turbine 10 and the stator 12. The compartment 18 is disposed radially inwardly of the region 19 of frictional engagement of a friction surface on the piston 17 (and more specifically of a friction surface on a friction lining 22 forming part of the piston) with a friction surface 21 which is carried by the housing section 4. The two friction surfaces are caused to abut each other in the engaged condition of the lockup clutch 15.

The friction surface 21 of the housing section 4 is provided at the inner side of a hollow frustoconical portion of the wall 9 radially outwardly of the compartment 18, and the friction surface of the friction lining 22 confronts the surface 21 in the engaged and disengaged conditions of the lockup clutch 15. The two friction surfaces taper toward the axis 27 of the housing 2 in a direction away from the compartment 20 and the parts 7, 10 and 12 therein. The friction lining 22 is bonded or otherwise reliably secured to a hollow frustoconical part 23 of a disc-shaped member 24 which can be made of metallic sheet material and is riveted (as at 17r) or otherwise reliably affixed to the piston 17 so that the members 17, 24 are held against axial movement relative to one another. The piston 17 is or can be obtained by deforming a suitable sheet metal blank. e.g., in a deep drawing machine.

Recently developed torque converters are designed in such a way that the friction surfaces of their lockup clutches can slip relative to one another in the disengaged as well as in the engaged conditions of the lockup clutches. This applies in particular for torque converters which are installed in the power trains of motor vehicles. As already discussed hereinbefore, the ability of the friction surfaces of a lockup clutch to slip relative to one another in the engaged condition of the clutch (or at least during certain stages of operation of the motor vehicle) results in the generation of heat (i.e., dissipation of energy) which can be quite pronounced (e.g., in the range of several kilowatts). As also mentioned above, such situation can develop when a motor vehicle is coupled to a trailer and is driven along a mountain road. Still further, the lockup clutch is likely to cause the torque converter to generate large amounts of heat during engagement or disengagement of the lockup clutch. In addition to the afore-discussed patent to Macdonald, reference may also be had to German patent applications Nos. P 42 28 137.7 and P 42 35 070.0 12 which also disclose torque converters with lockup clutches wherein the friction surfaces can slip relative to one another in the engaged condition of the clutch.

Excessive heating of the lockup clutch 15 could result in damage to or destruction of the friction lining 22 and would also adversely affect at least a substantial part of the supply of fluid in the chamber 14 of the housing 2. In order to avoid excessive heating of fluid and of various parts of the torque converter 3 and its lockup clutch 15 in the region (19) of the friction surface 21 and the friction surface of the friction lining 22, the lining 22 is provided with one or more suitably configurated and dimensioned passages 25 for the flow of fluid from the compartment 20 radially toward the axis 27 of the housing 2, i.e., radially inwardly toward the compartment 18 between the member 24 on the piston 17 and the wall 9 of the housing section 4. The passage or passages 25 (hereinafter referred to in plural) permit the establishment of an uninterrupted flow of fluid coolant across the region 19 between the friction lining 22 and the friction surface 21, even when the lockup clutch 15 is engaged or practically engaged. The rate of fluid flow in the passages 25 of the friction lining 22 along the friction surface 21 is sufficient to ensure the withdrawal of substantial quantities of heat from the housing section 4, from the piston 17 and from the member 24.

One presently preferred form of the passages in the friction lining of a lockup clutch which embodies the present invention will be described with reference to FIGS. 6 and 7.

Each passage 25 has inlets 26, 26a which are provided in the radially outer portion of the disc-shaped member 24 and through the piston 17, respectively. The inlets 26, 26a are substantially parallel with the axis 27 of the housing 2 to establish a path for the flow of fluid from the compartment 20 into the respective passage 25 toward the compartment 18. Each inlet 26a can constitute a bore or hole in the body of the piston 17 and each inlet 26 can be a hole in the disc-shaped member 24. The outlets of the passages 25 are located at the radially inner portion of the friction lining 22 and communicate with channels 18a which discharge fluid into the radially inner portion of the compartment 18.

The channels 18a are defined by two members of the lockup clutch 15, namely by the sheet metal disc-shaped member 24 and the adjacent radially inner portion of the piston 17. The path for the flow of fluid from the compartment 20 radially inwardly toward the compartment 18 is established in part by the passages 25 in the friction lining 22 and in part by the channel or channels 18a between the piston 17 and the member 24. Such path allows the fluid to flow from the compartment 20 toward and into the compartment 18 irrespective of whether the lockup clutch 15 is engaged or disengaged. The flow of fluid from the passages 25 takes place through openings or ports (e.g., bores) 28 in the member 24. The radially inner portion of the member 24 is provided with impressed or embossed portions 29 which constitute distancing elements to maintain the neighboring portions of the piston 17 and the member 24 at a selected distance from each other (as seen in the direction of the axis 27 of the housing 2). The channels 18a alternate with the embossed portions 29 and are configurated in such a way that the fluid issuing from the ports 28 flows in the respective channels 18a substantially radially inwardly and into the compartment 18. The channels 18a can be said to constitute a circumferentially incomplete annular space which is interrupted by the embossed portions 29 of the member 24. The fluid which enters the compartment 18 (the latter is located between the component or wall 9 of the housing section 4 and the sheet metal member 24) is permitted to issue from the radially innermost portion of the compartment 18 as indicated by the arrows. The discharge ends of the channels 18a are located radially inwardly of the rivets 17r which fixedly secure the neighboring portions of the members 17 and 24 to each other so that the embossed portions or distancing elements 29 are urged against the piston.

The piston 17 is provided with an embossed or impressed annular portion 30 which is located radially outwardly of the channel or channels 18a and also constitutes a distancing element between the piston and the member 24. Such distancing element contributes to the rigidity of the piston 17 and the member 24 in the region 19 of the friction surface 21 and the friction lining 22. Furthermore, the distancing element 30 establishes a radial seal between the members 17 and 24.

When the lockup clutch 15 is engaged, the flow of fluid coolant takes place from the second compartment 20, through the inlets 26, 26a, through the passages 25, through the ports 28, through the channel or channels 18a and thence radially inwardly toward the hub 11 of the turbine 10. The fluid which leaves the compartment 18 at the hub 11 is caused to flow through a channel in the hub 11 and/or through one or more grooves in or at the hub 11 to enter a heat exchanger (not shown) wherein the heated fluid exchanges heat with another fluid prior to being admitted into a sump, from where it reenters the compartment 20 in the housing 2. In other words, the fluid coolant is caused to flow along an endless path from the compartment 20, into the compartment 18 (subsequent to cooling of the wall 9 at the friction surface 21 and of the piston in the region of the friction lining 22) to thereupon reenter the compartment 20.

The piston 17 and the member 24 (i.e., the members which define the channel or channels 18a) are connected to one another by the rivets 17r (which can be said to constitute or to form part of means for preventing axial movements of the piston 17 in the direction of the axis 27 in response to action of flowing fluid in the channel or channels 18a) in such a way that any axial component or components of the force generated by the fluid in the channel or channels 18a are neutralized or taken up or counteracted by the member 24 so that the axial position of the piston 17 remains unaffected by such forces. It is particularly important that the aforediscussed axial component or components of the force generated by cooling fluid in the channel or channels 18a should not cause any axial displacement of the piston 17 in a direction to the right (as viewed in FIG. 1), i.e., in a direction to reduce the magnitude of torque which can be transmitted between the friction surface 21 and the adjacent friction surface of the friction lining 22. Otherwise stated, the members 17, 24 and the rivets 17r cooperate to ensure that the member 24 and the piston 17 are propped or held relative to each other in such a way that the power flow between these members is an endless flow, i.e., a flow which is closed in itself.

The just-outlined mode of causing the cooling fluid to prevent an overheating of the wall 9 in the region of the friction surface 21 and/or of the piston 17 in the region of its friction lining 22 without initiating any undesirable reduction of the magnitude of torque which is being transmitted by the lockup clutch 15 is selected with a view to take into account the dynamics of cooling fluid flowing from the passages 25, through the channel or channels 18a, and into the compartment 18 at the hub 11 of the turbine 10. Furthermore, this distinguishes the improved torque converter 3 and its lockup clutch 15 from the corresponding constituents of the apparatus which is disclosed in the aforediscussed patent to Macdonald. The patentee discloses a torque converter and a lockup clutch or bypass clutch which are designed in such a way that the forces which are attributable to the dynamics of the cooling fluid are free to initiate a rise of fluid pressure so that the upper limit of the magnitude of torque which can be transmitted by the lockup clutch of Macdonald decreases in response to increasing RPM of the housing of the patented torque converter. A pronounced reduction of the maximum torque which can be transmitted by the lockup clutch of the patented torque converter is attributable to the dynamics of cooling fluid which flows in the patented torque converter radially inwardly between the radially extending wall of the housing and the piston. The magnitude of maximum torque which can be transmitted by the lockup clutch of Macdonald decreases as the rate of fluid flow radially inwardly between the housing of the patented torque converter and the piston of its lockup clutch increases. Applicants believe that this is attributable, at least in part, to the effect of coriolis acceleration upon the fluid which flows radially inwardly between the housing of the patented torque converter and the piston of its lockup clutch. Such acceleration develops in response to rotation of the housing of the patented torque converter and tends to impart to the fluid coolant a circulatory movement, while the fluid flows radially inwardly, to thus increase the pressure of the fluid coolant.

In contrast to the construction and mode of operation of the patented torque converter and its lockup clutch, the improved torque converter of FIG. 1 is designed to ensure that any rise of fluid pressure which develops as a result of radially inward flow of fluid in the channel or channels 18a and which can generate or actually generates forces acting in the direction of the axis 27 cannot cause any axial shifting of the piston 17 from that position which has been selected during transmission of torque from the housing section 4 through the lockup clutch 15 and to the turbine 10. At any rate, the influence of axially oriented forces which act upon the piston 17 and develop as a result of radially inward flow of cooling fluid in the channel or channels 18a upon the axial position of the piston is incomparably less pronounced (and actually negligible) in comparison with the influence of such forces upon the ability of a conventional lockup clutch to transmit a desired torque. In the torque converter 3 and the lockup clutch 15 of FIG. 1, the neutralization of the aforediscussed axially oriented forces is achieved by the establishment of the connection (by rivets 17r) between the members 17 and 24 which define the channel or channels 18a and cooperate to ensure that any force or forces developing in a direction to move the friction lining 22 of the piston 17 axially and away from the friction surface 21 are counteracted by forces acting upon the member 24 in a direction to urge the friction lining 22 against the friction surface 21.

The member 24 of the lockup clutch 15 shown in FIG. 1 extends radially inwardly close to the hub 11 of the turbine 10, i.e., the channel or channels 18a are rather long (as measured radially of the axis 27). However, it is equally within the purview of the invention to replace the member 24 with a member whose radially inner portion is located radially outwardly of the radially inner portion of the piston 17, i.e., the radial length of the channel or channels 18a can be less, and even substantially less, than that of the channel 18a which is shown in FIG. 1. This may be advisable if the designer of the torque converter 3 and its lockup clutch 15 desires to ensure that a predictable change of the magnitude of torque transmitted by the lockup clutch will take place in response to increasing RPM of the housing 2, i.e., in response to increasing rate of fluid flow from the compartment 20 into the compartment 18. It has been found that, at least in many or most instances, it is advisable to construct the lockup clutch 15 in such a way that the length of each channel 18a (as measured radially of the axis 27) is not less than 50% of the width of the compartment 18, i.e., not less than 50 percent of the width of the piston 17.

It is further possible to modify the structure of FIG. 1 so that a portion of the fluid which is to cool the housing 2 in the region of the wall 9 and the piston 17 in the region of the friction lining 22 flows from the compartment 20 into and through the channel or channels 18a and the remaining portion of the fluid flows from the compartment 20 through the section 18b of the compartment 18, i.e., radially inwardly through that section which is disposed between the wall 9 and the member 24 (as seen in the direction of the axis 27). The channel or channels 18a constitute the other section of the compartment 18. All that is necessary is to provide one or more openings in the member 24 so that they permit the fluid to flow between the sections 18a and 18b of the compartment 18. The combined area of the openings and/or their radial distance from the axis 27 will be selected in dependency upon the desired effect upon the cooling of certain parts of the torque converter 3 and its lockup clutch 15 and/or upon the magnitude of torque to be transmitted by the lockup clutch during certain stages of operation of the improved apparatus.

Figure 2:
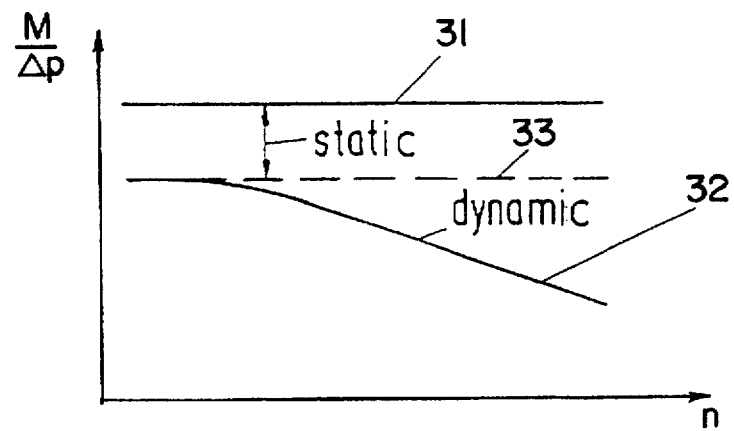
FIG. 2 is a diagram wherein the curves are characteristic of torque transmission by certain conventional lockup clutches as well by the improved lockup clutch.

In the diagram of FIG. 2, the RPM of the housing 2 is measured along the abscissa (at n), and the relationship $M/\Delta p$ of torque which can be transmitted by the lockup clutch to the pressure differential of fluid at opposite sides of the piston is measured along the ordinate. The curve 31 denotes the relationship of transmitted torque to the RPM of the housing for a preselected constant pressure differential between the fluids at the opposite sides of a piston forming part of a conventional lockup clutch, namely a clutch which is designed to prevent the flow of fluid between the spaces or compartments at opposite sides of the piston. The curve 31 indicates that, if Δp is constant, the magnitude of torque transmittable by the engaged lockup clutch in a conventional torque converter remains at least substantially unchanged. Torque converters utilizing such lockup clutches are disclosed, for example, in U.S. Pat. No. 4,649,763.

The curve 32 denotes in FIG. 2 the magnitude of torque which can be transmitted by the lockup clutch 15 in the torque converter 3 of FIG. 1 in response to changes of the RPM and at a constant pressure differential Δp between the fluids in the compartments 18, 20 and while the fluid is free to flow from the compartment 20 into the compartment 18 along the aforementioned path including the passages 25 and the channel or channels 18a. Torque converters which include lockup clutches capable of transmitting torque in a manner as denoted by the curve 32 are disclosed, for example, in U.S. Pat. No. 4,445,599 (granted May 1, 1984 to Bopp for "Cooling Means For Torque Converter Bypass") and in U.S. Pat. No. 5,056,631 (granted Oct. 15, 1991 to Macdonald for "Slipping Bypass Clutch Construction For A Hydrokinetic Torque Converter"). The patents disclose lockup clutches wherein the piston (pressure plate) and/or the counterpressure plate is provided with channels or openings disposed in the region of the friction lining or friction linings and permitting fluid coolant to flow from a compartment for the pump and turbine of the torque converter into a compartment between the piston and a wall of the housing of the torque converter. The establishment of a path for such flow of fluid in the patented torque converters entails that, when the value of Δp is constant, the maximum torque which can be transmitted by the lockup clutch decreases in response to increasing RPM. This is due to losses of fluid in the path or paths from the compartment for the turbine into the other compartment as well as to fluid losses along the path from the other compartment back into the compartment for the turbine. Additional losses develop during fluid flow through the lockup clutches of the patented torque converters. The curve 32 indicates that, for a selected value of Δp and at a low RPM, the maximum torque denoted by the curve 32 is less than the torque denoted by the curve 31. Furthermore, dynamic losses are superimposed upon the static losses so that the maximum torque transmittable by a lockup clutch as denoted by the curve 32 is even less. Dynamic losses are generated as a result of radially inward flow of fluid from the compartment for the turbine toward and into the other compartment. This is also shown in FIG. 2 wherein dynamic losses cause the curve 32 to slope downwardly toward the abscissa when the value of Δp is constant but the RPM of the housing of the torque converter increases.

The broken-line curve 33 denotes in FIG. 2 the torque which is being transmitted by the improved lockup clutch 15 of the present invention at a constant value of Δp. It will be noted that the maximum value of transmitted torque at a lower RPM and at a constant Δp is the same as that denoted by the left-hand portion of the curve 32. However, the maximum transmittable torque (by the lockup clutch of the present invention) remains unchanged whereas the maximum torque denoted by the curve 32 decreases due to pronounced influence of dynamic losses when the housing of the torque converter is rotated at a higher speed.

Of course, the characteristic curve denoting the maximum torque which can be transmitted by the improved lockup clutch 15 in the improved torque converter 3 of FIG. 1 can depart from the broken-line curve 33 in the diagram of FIG. 2. For example, the maximum value of transmittable torque may decrease at a certain rate in response to increasing RPM of the housing 2 of the torque converter 3. Nevertheless, it is now possible (by properly selecting the rate and the direction of fluid flow in the channel or channels 18a) to ensure that the curve 33 departs from an ideal curve solely as a result of static losses, i.e., that any dynamic losses developing when the lockup clutch 15 is in use do not affect the maximum transmittable torque at a selected constant value of Δp. At any rate, the influence of dynamic Δp losses upon the transmission of torque by the engaged friction clutch 15 at a given Δp is nil or not more than a minute fraction of the dynamic losses which develop when the transmission of torque is carried out by a conventional lockup clutch.

It is to be noted that the curves 31, 32 and 33 in the diagram of FIG. 2 were plotted without taking into consideration certain other parameters, such as friction within the conveyed fluid and/or friction between the flowing fluid and the adjacent surfaces.

Figure 3:
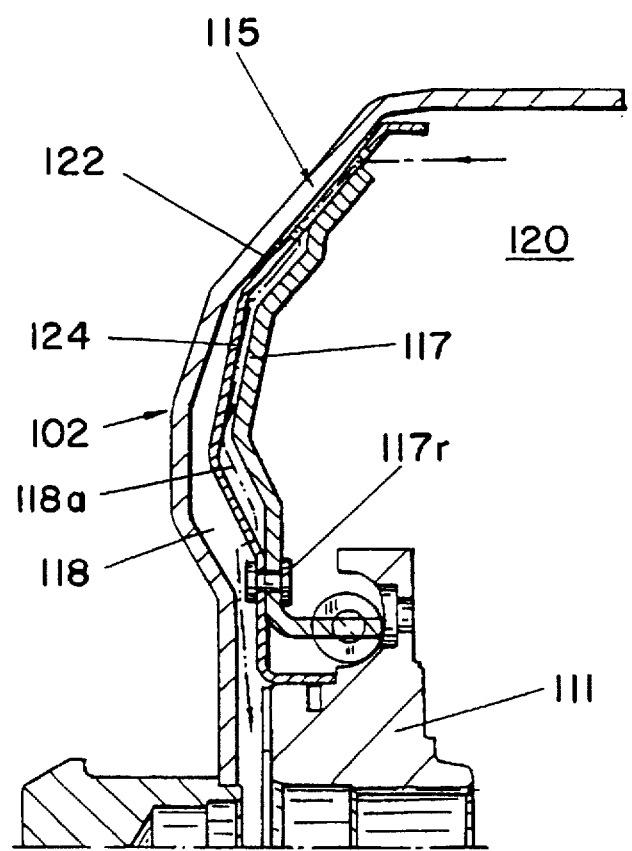
FIG. 3 is a fragmentary axial sectional view of a modified torque converter and of a modified lockup clutch.

FIG. 3 illustrates a portion of a torque converter which embodies a modified lockup clutch 115. As can be seen in FIG. 1, the radially outermost portion 17a of the piston 17 is adjacent the radially outer portion of the member 24. On the other hand, the radially outermost portion of the member 124 in the lockup clutch 115 of FIG. 3 extends well beyond the radially outer portion of the piston 117 and includes a relatively short tubular or cylindrical part which is closely adjacent the internal surface of the surrounding portion of the housing 102 of the lockup clutch. Furthermore, the radially innermost portion of the piston 117 is not mounted on the hub 111 of the turbine for movement in the axial direction of the housing 102. The member 124 is centered by and has limited freedom of axial movement relative to the hub 111. It can be said that the actual piston or pressure plate of the lockup clutch 115 of FIG. 3 is the member 124 and that the member denoted by the character 117 serves as a reinforcement or stiffener for the member 124.

The flow of fluid from the compartment 120 at one side into the compartment 118 at the other side of the composite piston including the members 117, 124 is indicated by arrows. Here, again, the fluid which flows radially inwardly in the channel or channels 118a is compelled to act upon the members 117 and 124 (these members are riveted to each other, as at 117r) in such a way that it cannot generate forces, which would reduce the ability of the clutch to transmit torque from the housing to the turbine in the engaged condition of the clutch. Otherwise stated, the fluid which flows radially inwardly in the channel or channels 118a cannot compel the piston 117 to move axially of and away from the adjacent radial wall of the housing 102, i.e., in a direction to reduce the magnitude of transmitted torque in response to increasing RPM of the housing 102. Thus, the lockup clutch 115 is also capable of at least substantially neutralizing dynamic forces which develop during flow of fluid coolant from the compartment 20 or 120 radially inwardly toward and through the channel or channels 18a or and into the compartment 18 or. Accordingly, the curve 33 of FIG. 2 denotes the torque which is being transmitted by the engaged lockup clutch 15 or 115.

As used herein, the term channel or channels is intended to embrace discrete grooves, tunnels or analogous path establishing recesses, bores, holes or cavities as well as circumferentially complete or incomplete chambers or spaces which enable the fluid to flow radially inwardly from the region of the friction lining or linings toward the second compartment 18 or 118. A circumferentially incomplete channel can be composed of several individual channels which may, but need not, communicate with one another. Still further, the member 17 and/or the member 24 of FIG. 1, as well as the member 117 and/or 124 of FIG. 3, can carry a set of discrete pipes or tubes which define the channels for the flow of fluid coolant from the passage or passages at the friction lining 22 or 122 into the compartment 18 or 118. The radially innermost portions of the pipes can discharge the conveyed fluid directly into the compartment 18 or 118 or into one or more channels or grooves in the hub 11 or 111 wherein the fluid flows toward and through a suitable cooling system (e.g., one or more heat exchangers) and thence into a sump to be returned into the compartment 20 or 120. Still further, it is possible to provide one or more tubular members in compartment 20 or 120 to direct the fluid toward and into the passages 25 of the lockup clutch 15 or into analogous passages of the lockup clutch 115.

The passages 25 in the clutch 15 of FIG. 1 and/or the passages of the clutch 115 need not necessarily be provided in the friction lining 22 or 122. Thus, it is equally possible to provide such passages in the wall 9 of the housing 2 of FIG. 1 and/or in the corresponding wall of the housing 102. Still further, passages in the friction lining of a lockup clutch can be provided in addition to passages in the housing 2 or 102.

The construction of the clutch 115 is such that the member 117 need not be provided with openings corresponding to the inlets 26a in the piston 17 of FIG. 1; however, it is necessary to provide one or more openings (not referenced) in the member 124 of FIG. 3 in order to enable the fluid to flow from the channel or channels 118a into the compartment 118. The openings 26 and/or the openings 28 and/or the openings in the member 124 can be designed with a view to influence the fluid in a manner corresponding to that of orifices of discrete nozzles. For example, the surfaces bounding such openings can be configurated to throttle the flow of the fluid therein.

As already mentioned above, the friction lining 22 can be provided on the wall 9 or this wall can carry an additional friction lining which provides the friction surface 21. Analogously the friction lining 122 shown in FIG. 3 can be provided on the member 124 or on the adjacent portion of the housing 102, or the lockup clutch 115 can employ two friction linings, one on the composite piston including the members 117, 124 and the other on the adjacent radial wall of the housing 102.

Each friction lining can be bonded (e.g., adhesively secured) to the respective carrier. The passages in the friction linings can be formed by impressing them into the friction surfaces of the friction linings and/or by removing some material from the friction surfaces. Furthermore, each passage (such as the passage 25 shown in FIG. 1) can be provided in part in a friction lining and in part in the adjacent friction surface, such as the friction surface of the wall 9 forming part of the housing 2 shown in FIG. 1. It has been found that the passages in the friction surfaces of friction linings and/or in the friction surfaces which are contacted by friction linings when the lockup clutch is engaged ensure a highly satisfactory exchange of heat between the friction surfaces and the fluid coolant to thus ensure that the parts which are provided with friction surfaces as well as the fluid are not subjected to excessive or even very pronounced thermal stresses.

The provision of inlets (such as 26) close to the radially outermost portions of the friction surfaces and of the outlets (such as 28) close to the radially innermost portions of the friction surfaces also contributes to highly satisfactory and uniform dissipation of heat by the parts which carry the friction surfaces. The feature that the channel or channels (18a, 118a) are relatively long (preferably not less than half the width of the compartment 18 or 118) is desirable and advantageous because this even further reduces the likelihood of the development of unbalanced axial stresses which would tend to move the piston of the engaged lockup clutch in a direction to reduce the magnitude of torque which is to be transmitted from the housing to the turbine of the torque converter.

FIG. 1 shows that the path of fluid from the compartment 20 into the compartment 18 extends through the inlets 26, 26a of a passage 25 and thereupon through the respective outlet 28 which includes openings in the friction lining 22 and in the member 17. However, it is equally possible to extend the passages 25 all the way to the radially innermost portion of the friction lining 22 so that the establishment of an outlet then merely necessitates the provision of a hole or opening in the member 24 radially inwardly of the friction lining 22. In other words, fluid which issues from a passage 25 need not flow through the friction lining 22 prior to traversing the member 24 on its way into the radially outer portion of a single channel 18a or one of several channels.

Figure 4:
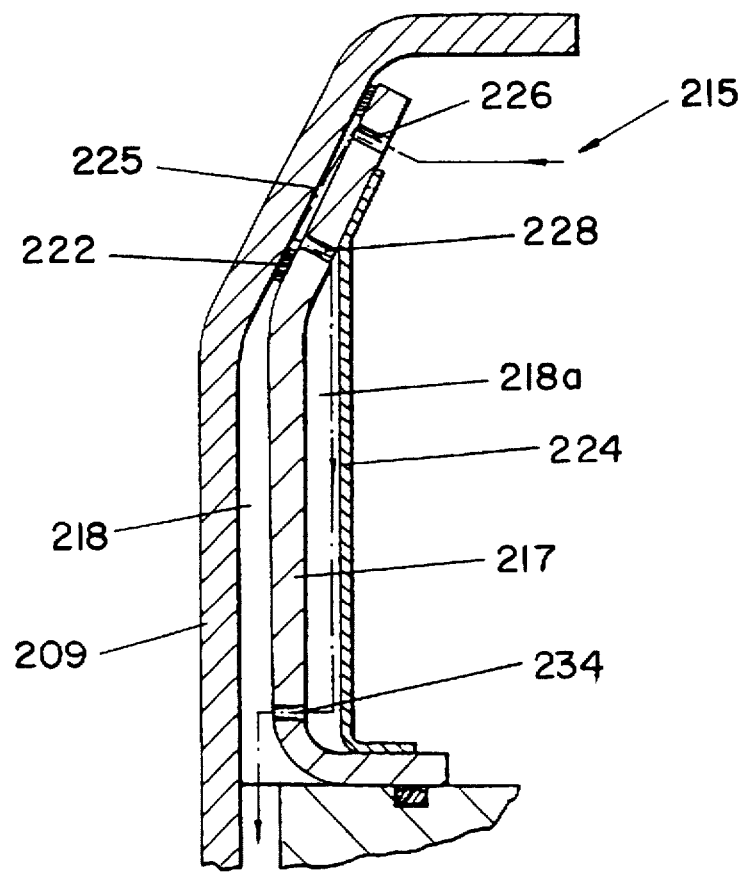
FIG. 4 is a fragmentary axial sectional view of a third torque converter and a third lockup clutch.

FIG. 4 shows certain details of a portion of a lockup clutch 215 which is installed in the housing of a torque converter in such a way that the channel or channels 218a are disposed between the piston 217 and the member 224 at that side of the piston which faces away from the wall 209 of the housing. Otherwise stated, the piston 217 is installed between the member 224 and the wall 209. The member 224 can constitute a converted blank of metallic sheet material and includes a washer-like central portion, a frustoconical radially outer portion and a sleeve-like radially inner portion. The passages 225 are provided between the frustoconical radially outer portion of the piston 217 and the adjacent frustoconical portion of the wall 209. The outlet of each passage 225 communicates with the radially outer portion of a single channel 218a or one of several channels by way of a port 228 in the piston 217. Each passage 225 is provided in the friction lining 222. The radially innermost portion of each channel 218a communicates with the adjacent portion of the compartment 218 by way of one or more axially parallel openings 234 in the piston 217. It will be noted that the compartment 218 extends radially of the axis of the housing of the torque converter intermediate the wall 209 of the housing and the adjacent side of the piston 217.

Not only the channel 18a which is shown in FIG. 1 or the channel 118a which is shown in FIG. 3 but also the channel 218a shown in FIG. 4 can constitute an annular chamber extending all the way around the axis of the housing of the torque converter between the confronting surfaces of the piston 17, 117 or 217 and the member 24, 124 or 224. If the improved lockup clutch is provided with a number of channels to establish paths between the passages in a friction lining and the first compartment, the member 24, 124 or 224 can be replaced with one or more tubular members which convey the fluid from the passages into the first compartment of the respective torque converter. By way of example, the member 24 of FIG. 1 or the member 224 of FIG. 4 can be replaced with one or more tubes which establish paths for the flow of fluid from the passages 25 or 225 into the compartment 18 or 218.

The outlets of the passages in a friction lining need not discharge the fluid coolant into a first compartment (such as the compartment 218) or into a section (such as 18b) of the first compartment. Instead, the outlets of the passages can discharge fluid into one or more radially extending bores in the hub of the turbine (such as the hub 11 of the turbine 10 which is shown in FIG. 1), and the hub then surrounds a conduit or other suitable means for conveying the heated fluid into a heat exchanger.

Figure 5:
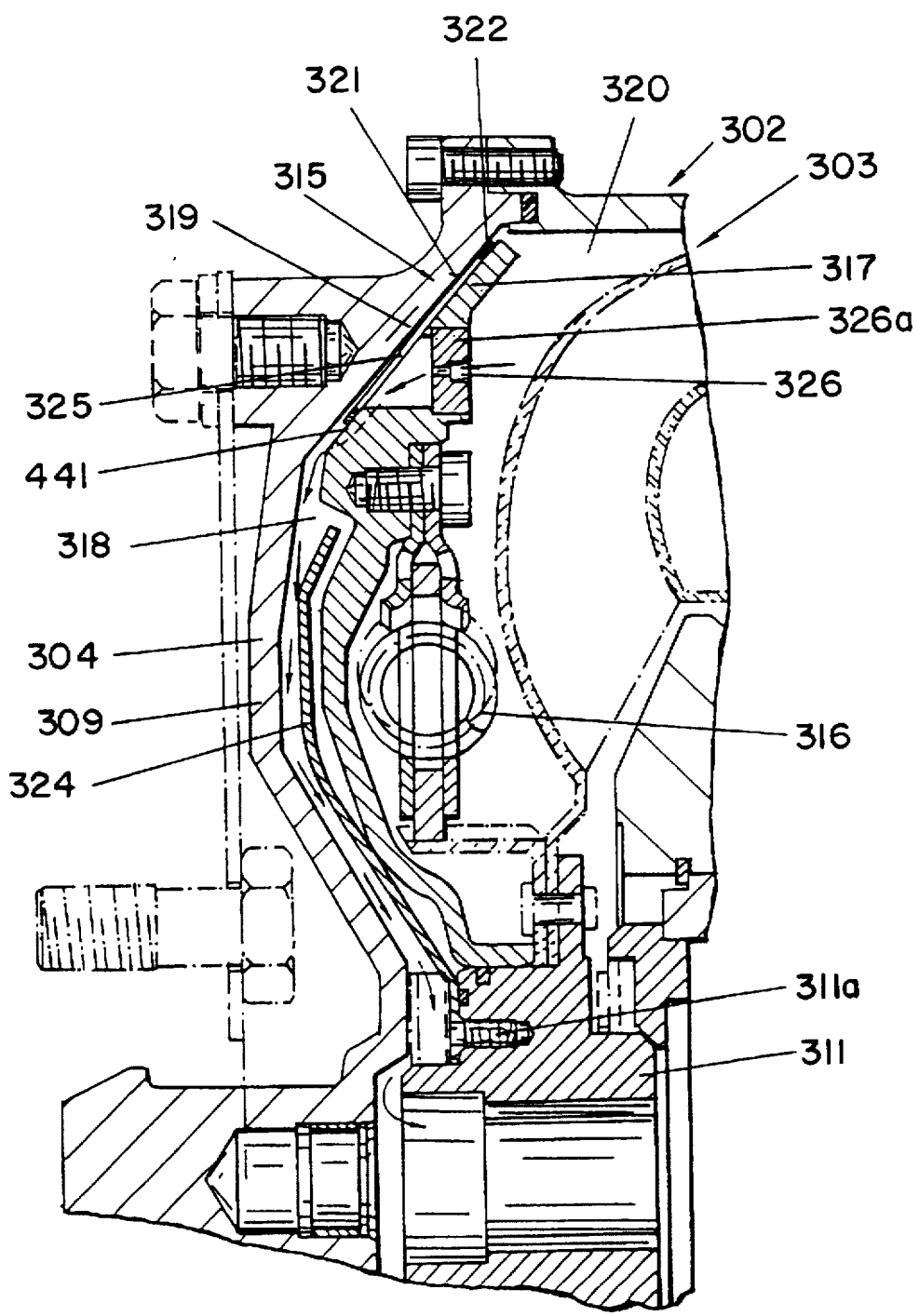
FIG. 5 is a fragmentary axial sectional view of a fourth hydrokinetic torque converter and a fourth lockup clutch.

FIG. 5 shows a portion of a hydrokinetic torque converter 303 which includes a modified lockup clutch 315. The piston 317 of the clutch 315 divides the chamber of the housing 302 into a first compartment 318 and a second compartment 320. The piston 317 is movable in the axial direction of the housing 302 and is centered by the hub 311 of the turbine in the housing 302. A damper 316 is interposed between the piston 317 and the turbine to transmit torque from the housing 302 to the hub 311 when the lockup clutch 315 is engaged. The illustrated damper 316 includes a set of arcuate energy storing elements in the form of coil springs, an input member which is of one piece with or is carried by the piston 317, and an output member which is of one piece with or is carried by the turbine or its hub 311.

When the clutch is engaged and the housing 302 of the torque converter 303 is driven by a prime mover, such as a combustion engine in a motor vehicle, the fluid coolant is caused to flow from the compartment 320 and at least substantially radially inwardly toward and into the compartment 318. The fluid in the compartment 318 flows radially inwardly between the wall 309 of the housing 302 and the member 324 which is affixed to the hub 311. The passages 325 at the friction lining 322 have inlets 326 which are provided in nozzles 326a (one shown in FIG. 5) installed in and close to the radially outermost portion of the piston 317. The illustrated nozzle 326a acts as a flow restrictor and the jet or stream of fluid issuing from its orifice 326 (i.e., from the inlet of the respective passage 325) impinges upon the friction surface 321 of the wall 309 forming part of the housing section 304 as well as upon the friction surface of the friction lining 322. The region of the two friction surfaces is identified by the character 319 and is disposed between frustoconical portions of the wall 309 and piston 317. The passages 325 are or can be provided in the friction lining 322 and/or in the friction surface 321 of the wall 309. Each passage 325 discharges the fluid directly into the radially outermost portion of the compartment 318, and such radially outermost portion can be said to constitute a channel which directs the inflowing fluid radially inwardly toward the axis of the housing 302.

Even though the member 324 is nonmovably affixed to the hub 311 of the turbine while the piston 317 is free to move (within limits) relative to the hub 311 in the axial direction of the housing 302, the fluid flowing radially inwardly within the compartment 318 cannot cause undesirable axial shifting of the piston 317. This is due to the fact that any and all axially oriented components of the force generated by the fluid in the compartment 318 are taken up by the member 324 which is affixed to the hub 311 against movement in the axial direction of the housing 302.

In lieu of affixing the member 324 to the hub 311 of the turbine, it is equally possible to affix this member to the housing 302 in such a way that the member 324 cannot move or cannot yield in the axial direction of the housing. All that counts is to ensure that the fluid flowing radially inwardly from the passages in the region of the friction surfaces toward and into one or more channels of or leading into the first compartment cannot cause any undesirable axial shifting of the piston in a direction to disengage the respective lockup clutch or to reduce the magnitude of torque which is to be transmitted by the lockup clutch.

The passages can be provided in the friction lining on the piston of the lockup clutch, in the friction surface of the housing, in the piston itself and/or even in the member which cooperates with the piston to define one or more channels connecting the passages with the first compartment. For example, it is within the purview of the invention to provide one or more passages in the member 24 of the lockup clutch 15 or in the member 124 of the lockup clutch which is illustrated in FIG. 3. A piston which forms part of a lockup clutch or bypass clutch and is provided with one or more passages for the flow of oil is disclosed in the aforementioned U.S. Pat. No. 5,056,631 to Macdonald.

Those novel features of a hydrokinetic torque converter and its lockup clutch which were described with reference to FIGS. 1 to 5 can be embodied with equal or similar advantage in many other types of torque converters and lockup clutches. For example, the aforediscussed feature of causing the fluid to flow radially inwardly past the friction surfaces of the clutch and the provision of means for preventing axial movements of the piston in the direction of the axis of the housing of the torque converter in response to the action of fluid in the channel or channels leading the fluid from the passages at the friction linings into the first compartment of the chamber defined by the housing can be put to use by properly modifying certain heretofore known torque converters, for example, those described and illustrated in U.S. Pat. No. 4,493,406 and in U.S. Pat. No. 4,445,599.

Figure 6:
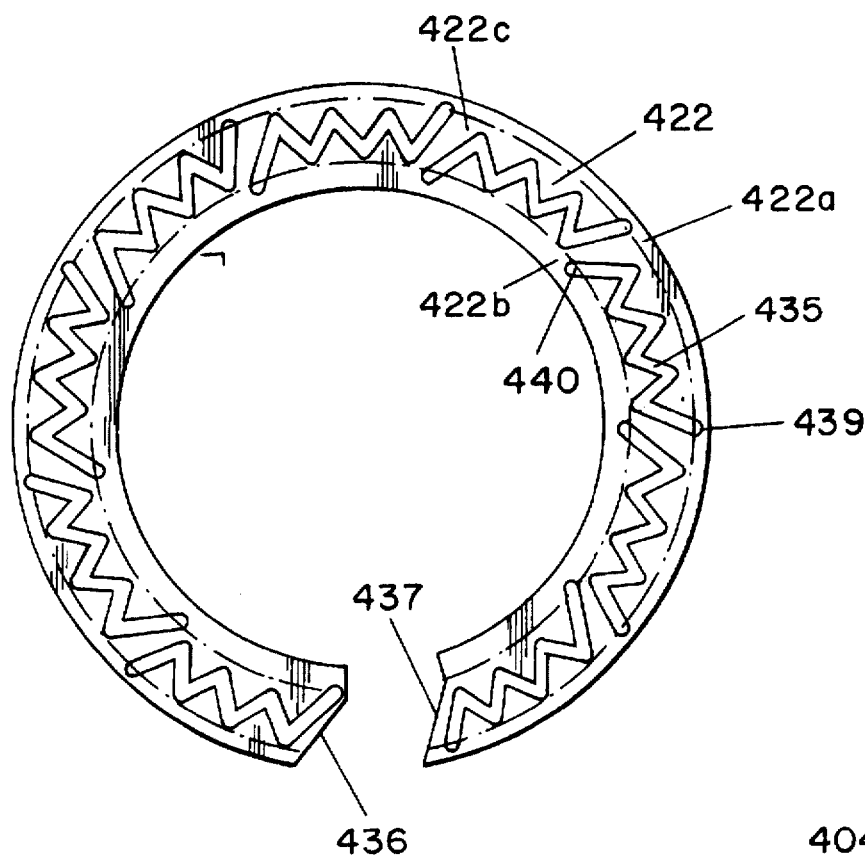
FIG. 6 is an elevational view of a friction lining which can be utilized in the improved lockup clutch.

FIG. 6 shows a friction lining 422 which resembles a split ring and can be put to use in the improved lockup clutch, e.g., in lockup clutches of the type described with reference to FIGS. 1 and 3 to 5. The friction lining 422 comprises a continuous arcuate radially outer portion 422a and a continuous arcuate radially inner or central portion 422b. The arcuate central portion 422b of the friction lining 422 is provided with a plurality of substantially meandering or zig-zag shaped passages 435 in the form of cutouts or depressions in the friction surface, i.e., in that surface which contacts the other friction surface when the lockup clutch embodying the friction lining 422 is engaged.

Each of the several passages 435 has an inlet 439 at the radially outer portion 422a and an outlet 440 at the radially inner portion 422b of the friction lining 422. The illustrated nine passages 422 together constitute a composite arcuate passage which extends along an arc of nearly or exactly 360° when the friction lining 422 is bonded or otherwise affixed to the piston or to the other component which carries a friction surface, e.g., to the piston 17 or to the wall 9 of the housing 2 in the torque converter 3 of FIG. 1.

An advantage of an uninterrupted or continuous passage or of a composite passage (such as the one including passages 435 of the type shown in FIG. 6) is that the fluid is compelled to flow along an elongated path and to thereby withdraw large amounts of heat from the adjacent portion of the piston or the other component which carries a friction surface. This reduces the thermally induced stresses upon the piston and the adjacent component of the lockup clutch as well as upon the fluid coolant.

The length and the configuration of the passages 435 in the friction lining 422 are preferably selected in such a way that the resistance to the flow of fluid coolant therein is satisfactory even under the most difficult or adverse circumstances of use of the lockup clutch and the torque converter in which the clutch is put to use. In other words, even if the fluid is being heated to a maximum permissible temperature, the rate of fluid flow between the compartments at opposite sides of the piston should not exceed that value at which the system pressure in the torque converter is likely to collapse. It is preferred to select the rate of fluid flow in the passages 435 in such a way that it is not unduly influenced by the temperature of the fluid, i.e., that the rate of fluid flow between the two compartments can or may fluctuate depending upon variations of certain parameters of the torque converter, the prime mover which drives the torque converter and/or the unit or units which receive torque from the torque converter, but should not be dependent, or should not be overly dependent, upon the fluctuations of the temperature of fluid coolant.

The nine illustrated passages 435 in the friction surface of the friction lining 422 of FIG. 6 have identical dimensions and identical shapes and are equidistant from each other when the friction lining is bonded to a frustoconical portion of the piston or to a frustoconical portion of the adjacent wall of the housing or to a frustoconical portion of a member corresponding to the member 24 in the torque converter 3 of FIG. 1. The number of discrete passages 422 can be reduced to less than nine or increased to ten or more, but is preferably not less than three.

When bonded to a frustoconical surface (such as the left-hand side of the conical radially outer portion of the member 24 in the lockup clutch 15 of FIG. 1), the split friction lining 422 preferably constitutes a circumferentially complete hollow conical frustum. In other words, the two end portions 436 and 437 of the friction lining 422 are then closely or immediately adjacent each other or actually abut one another.

Figure 7:
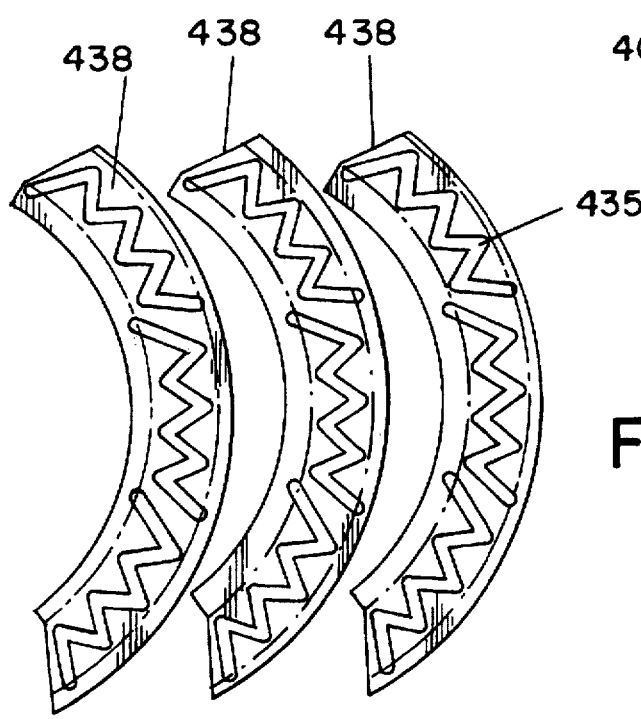
FIG. 7 illustrates three arcuate sections of a modified friction lining.

A friction lining of the type shown in FIG. 6 can be replaced by a friction lining which is assembled of two or more arcuate sections or segments 438 of the character shown in FIG. 7. This reduces waste in the material of which the sections 438 are made. Each of the illustrated arcuate sections 438 is provided with a set of three identical passages 435. The sections 438 are bonded or otherwise secured to the piston, to the wall of the housing or to another member (such as 24) of the torque converter so that they jointly constitute a hollow frustoconical friction lining.

The manipulation of the arcuate sections 438 can be simplified by applying an adhesive-coated foil to one side of the blank from which the sections are removed, e.g., in a stamping or another suitable machine. The application of such foil is facilitated because the one side of the blank is smooth, i.e., it need not be provided with passages 435 or with otherwise configurated and/or dimensioned passages. The provision of continuous radially inner and radially outer portions 422a, 422b on the friction lining 422 of FIG. 6 and of continuous radially inner and radially outer portions on the sections 438 of FIG. 7 also facilitates the manipulation of such friction lining or such sections prior to as well as during bonding to a carrier such as the piston of the improved lockup clutch.

It is clear that if, for example, the piston of the improved lockup clutch is to be provided with a friction lining of the type shown in FIG. 6 or 7, the piston must be provided with suitably distributed inlets (such as 26 or 226 or 326) to establish paths for the flow of fluid coolant into the inlets 439 of the passages 435 in the friction lining. Furthermore, it is necessary to establish paths (e.g., bores, holes, slots or the like) for the flow of fluid from the outlets 440 of the passages 435 into the channel of channels serving to cause the fluid to flow radially inwardly into the first compartment of the housing of the torque converter. Alternatively, the piston or another component which carries a friction lining of the type shown in FIG. 6 or 7 can be provided with grooves which receive fluid from the passages 435, i.e., such carrier of the friction lining need not be provided with bores, holes or slots which extend all the way between the two sides of the carrier. For example, the ports 228 in the piston 217 of FIG. 4 can be omitted if the left-hand side of the piston is provided with grooves receiving fluid streams from the outlets 440 of passages 435 of the type shown in FIG. 6 or 7. FIG. 5 shows, by broken lines, a groove 441 in the left-hand side of the frustoconical portion of the piston 317; such groove is angularly offset relative to the respective inlet 326 and directs fluid coolant into the compartment 318.

It is presently preferred to configurate the passages 435 in such a way that each passage includes at least two turns which alter the direction of fluid flow from a direction toward the radially outer portion (such as 422a) toward the radially inner portion (such as 422b) of the respective friction lining (such as 422). Each of the illustrated passages 435 has six turns, i.e., a total of seven straight or substantially straight portions (depending upon whether the passages are zig-zag shaped or substantially zig-zag shaped, such as sinusoidal, snake-like or meandering). For example, each of the illustrated zig-zag shaped passages 435 can be replaced by a sinusoidal or snake-like passage having a series of six concavo-convex portions.

Figure 8:
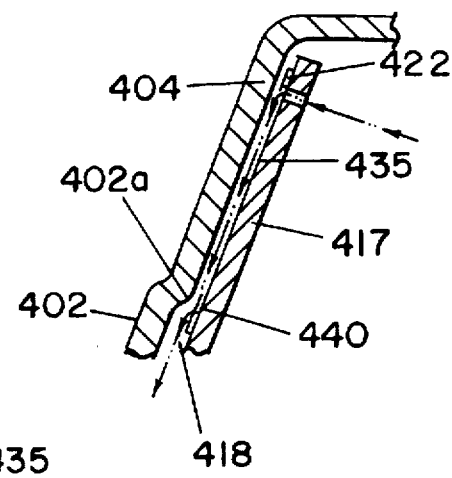
FIG. 8 is a fragmentary axial sectional view of a further hydrokinetic torque converter and its lockup clutch.

FIG. 8 illustrates a portion of a torque converter wherein the piston 417 of the lockup clutch carries a friction lining 422 identical with or resembling the friction lining of FIG. 6. The friction lining is bonded to the left-hand side of the frustoconical portion of the piston 417 opposite the adjacent frustoconical portion of the wall forming part of the section 404 of the housing 402 of the torque converter. The section 404 has an axially extending circumferential internal shoulder 402a at the radially inner end of the illustrated passage 435. The shoulder 402a bounds one side of the radially outermost portion of the channel forming part of or leading into the compartment 418. In other words, the shoulder 402a is located opposite the outlets 440 of grooves 435 in the friction lining 422.

In order to reduce the influence of the temperature and/or viscosity of the fluid coolant, as well as the influence of the pressure differential between the two compartments in the housing of the torque converter, upon the rate of fluid flow between the two compartments, a further feature of the present invention resides in the provision of one or more devices constituting means for regulating the rate of fluid flow along the friction surfaces of the lockup clutch by taking into consideration the variations of the aforementioned parameters, such as the temperature and viscosity of the fluid and the difference between the pressures in the two compartments of the housing of the torque converter. The regulating means can vary the rate of fluid flow in dependency upon one or more of the aforediscussed parameters.

Figure 8A:
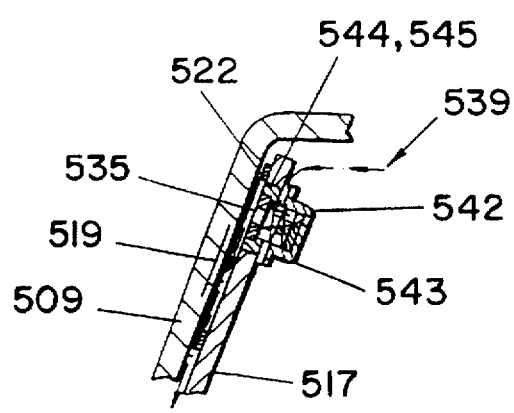
FIG. 8a is a fragmentary axial sectional view of still another torque converter and of its lockup clutch which is provided with means for regulating the rate of fluid flow between the fluid-containing compartments at the opposite sides of the piston or pressure plate.
Figure 9:
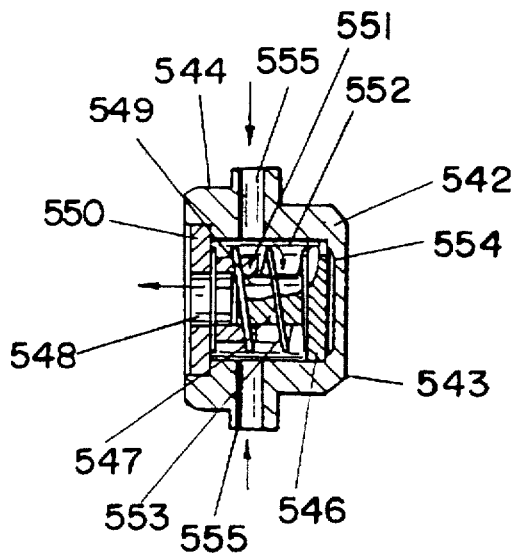

The regulating means can comprise one or more adjustable valves 542 of the type shown in FIGS. 8a and 9. The illustrated valve 542 is carried by the piston 517 and comprises a body or housing 543 located at that side of the piston 517 which faces away from the friction lining 522. To this end, the body 543 comprises a short annular portion 544 which is received in a complementary bore or socket 545 of the piston 517. For example, the portion 544 can be a press fit in the socket 545.

As best shown in FIG. 9, the body 543 of the valve 542 defines a chamber 552 for a reciprocable piston or plunger 546 (hereinafter called plunger to distinguish from the piston 517 of the lockup clutch). The plunger 546 is provided with an axial extension 547 which is reciprocable in an opening 548 provided in a sleeve 550 which is installed in the body 543. Opening 548 constitutes the outlet of a path for the flow of fluid coolant through the body 543. The rate of fluid flow through the body 543 can be altered by changing the axial position of the plunger 546 in the chamber 552. To this end, the extension 547 of the plunger 546 is configurated to ensure that the rate of fluid flow through one or more substantially axially parallel grooves 549 of the extension 547 is altered in response to shifting of the plunger 546 toward or away from the bottom wall or end wall 554 of the body 543. The body 543 is further provided with two or more tubular inlets 555 which admit the fluid coolant into the groove or grooves 549 of the extension 547. It is also possible to configurate the surface bounding the opening 548 in the sleeve 550 in such a way that the rate of fluid flow from the valve 542 into the respective passage 535 can be altered in a predictable manner in response to axial displacement of the piston 546 in the cylinder chamber 552.

The sleeve 550 is a press fit or is otherwise securely held in the body 543 and includes a smaller-diameter extension 551 in the chamber 552. The sleeve 550 and its extension 551 constitute a retainer for one end portion of a counterbalanced coil spring 553 which bears upon the larger-diameter portion of the plunger 546 so that the plunger is urged toward the bottom end wall 554, i.e., in a direction to increase the rate of fluid flow through the body 543.

The valve 542 increases the rate of fluid flow through its housing 543 when the difference between the fluid pressures in the two compartments in the housing including the section 504 of FIG. 8a is relatively small.

The inlets 555 admit fluid from the second compartment of the housing including the section 504 into the inlet of the respective passage 535 at the radially outer portion of the area 519 of frictional engagement between the friction lining 522 and the section 509 in the engaged condition of the lockup clutch. It is also possible to install the valve 542 and to configurate the piston 517 in such a way that the valve can admit fluid coolant to two or more passages 535.

The configuration of the groove or grooves 549 in the extension 547 of the plunger 546 is such that the rate of fluid flow from the inlets 555 to the opening 548 is reduced in response to shifting of the plunger 546 in a direction to the left, i.e., so as to move the extension 547 deeper into the opening 548. Furthermore, the characteristic of the spring 553 is such that, in conjunction with appropriate shaping of the surface(s) surrounding the groove(s) 549, the valve 542 automatically regulates the rate of fluid flow through the valve so that the rate is constant during each stage of operation of the torque converter. Furthermore, the valve 542 renders it possible to ensure that the rate of fluid flow into the respective passage or passages 535 is at least substantially independent of the pressure differential in the compartments at opposite sides of the piston 517.

However, it is equally possible to design the valve 542 (e.g., by appropriate shaping of the surface(s) bounding the groove(s) 549 and/or by appropriate dimensioning of the cross-sectional area of the opening 548 and/or by appropriate selection of the characteristic curve of the spring 553) in such a way that one can select any one of an array of different characteristic curves for the rate of fluid flow through the valve. For example, the valve 542 can be designed in such a way that the rate of fluid flow through the body 543 is gradually increased or gradually reduced in response to increasing difference between the fluid pressures in the two compartments of the housing of the torque converter. If desirable or necessary, the valve 542 or an analogous fluid flow regulating device can be designed and installed in such a way that the flow of fluid in the passage(s) 535 is completely interrupted when the pressure differential between the two compartments rises to a predetermined value. However, at least in most instances, it is advisable or sufficient to design the valve 542 or its equivalent in such a way that the rate of fluid flow from the second compartment into the passage(s) 535 is at least substantially constant, i.e., that it is practically independent of fluctuations of pressure of fluid coolant in the first and/or the second compartment, such as at the inlets 555 of the valve body 543. A valve which regulates the rate of fluid flow with a view to avoid any, or any appreciable, changes in response to changes of the difference between the fluid pressures in the two compartments exhibits the additional advantage that it can be readily designed and installed in such a way that the rate of fluid flow from the inlets 555 to the opening 548 is at least substantially independent of fluctuations of the temperature of the conveyed fluid.

FIG. 8a shows that the valve 542 is installed at the inlet 539 of the passage 535 in the friction lining 522 which is bonded to the piston 517.

Figure 9A:
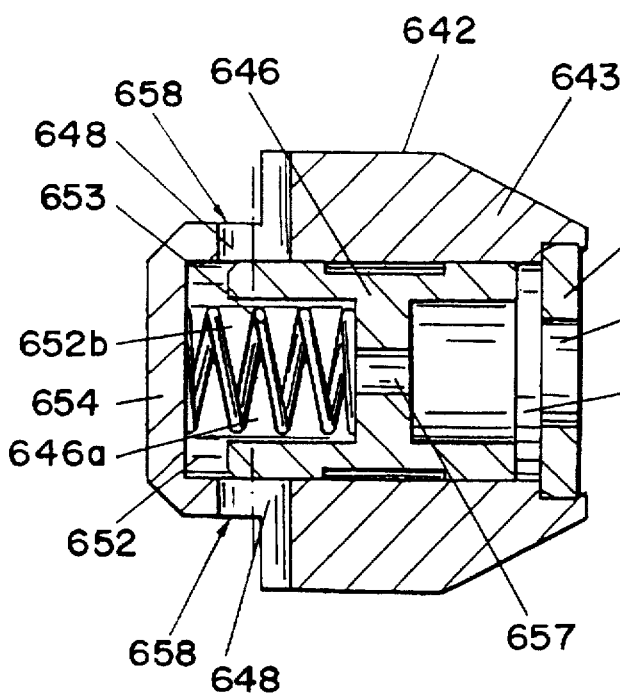
FIG. 9a is an axial sectional view of modified fluid flow regulating means.

FIG. 9a illustrates a modified fluid flow regulating valve 642 which can be utilized in lieu of the valve 542. All that is necessary is to alter the socket in the piston or another component of the torque converter so that the body 643 of the valve 642 can be a press fit or is otherwise securely held therein. The valve 542 or 642 can also be used as a substitute for the nozzle 326a which is shown in FIG. 5. The body 643 defines a cylindrical chamber 652 for a reciprocable plunger 646. The chamber 652 is a blind bore or hole in the body 643, and its open end is partially sealed by a washer-like insert 650 defining a central opening 650a constituting the inlet of the valve 642. A calibrated resilient element 653, such as a coil spring, is installed in the cylinder chamber 652 to react against the bottom end wall 654 and to bear upon the plunger 646 in order to urge the plunger toward the insert 650. FIG. 9a shows that the left-hand end face of the plunger 646 is provided with a recess 646a for a substantial number of convolutions of the spring 653. The plunger 646 divides the cylinder chamber 652 into a first section 652a at the insert 650 and a second section 652b at the end wall 654.

The section 652a of the cylinder chamber 652 receives fluid coolant by way of the central opening 650a in the insert 650. The pressure of fluid entering the cylinder chamber section 652a corresponds to fluid pressure in the second compartment of the housing of the torque converter, i.e., in that compartment which accommodates the turbine and the pump. The left-hand section 652b of the cylinder chamber 652 receives fluid through a flow restricting channel or orifice 657 in the plunger 646. The orifice 657 serves as a means for establishing a pressure differential $\Delta p$ between the sections 652a and 652b of the cylinder chamber 652. The orifice 657 is in series with a regulating orifice 658 which is provided in the valve body 643 and serves to regulate the rate of fluid flow into one or more passages depending upon the pressure of fluid in the section 652a of the cylinder chamber 652. This is achieved in that, by properly selecting the cross-sectional are of the regulating orifice 658, one can select a predetermined value for the pressure differential $\Delta p$. As already pointed out hereinbefore, it is normally advisable and desirable to regulate the rate of fluid flow in such a way that it remains at least substantially constant. The illustrated regulating orifice 658 is composed of a set of radially extending ports 648 in the body 643 of the valve 642. The effective combined cross-sectional area of the ports 648 is changed in response to axial displacement of the plunger 646 in the cylinder chamber 652.

When the fluid pressure in the section 652a of the cylinder chamber 652 rises, the plunger 646 is displaced in a direction to the left, as viewed in FIG. 9a, i.e., in a direction to stress the valve spring 653, so that the combined effective cross-sectional area of the ports 648 is reduced accordingly. This, in turn, entails a rise of fluid pressure in the section 652b of the cylinder chamber 652 so that the pressure differential is altered in a direction to ensure that the rate of fluid flow from the cylinder chamber section 652b into the ports 648 matches the desired value. Each port 648 can discharge a fluid coolant into a discrete passage or all of the ports 648 in the body 643 of the valve 642 can admit fluid into the inlet of a single passage.

Figure 10:
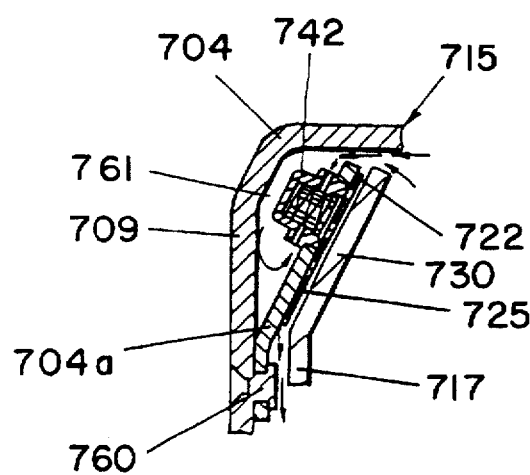
FIG. 10 is a fragmentary axial sectional view of a torque converter and a lockup clutch which is provided with differently positioned fluid flow regulating means.

FIG. 10 illustrates a portion of a hydrokinetic torque converter including a lockup clutch 715 having a friction lining 722 bonded or otherwise affixed to the right-hand side of a substantially frustoconical component 704a riveted (as at 760) or otherwise affixed to the wall 709 of the section 704 of a composite housing which can be constructed in the same way as the housing 2 of the torque converter 3 shown in FIG. 1. The component 704a can be made of metallic sheet material and the friction surface of its lining 722 confronts the friction surface at the radially outermost portion of the piston 717.

The rivets 760 can constitute separately produced parts; however, and as actually shown in FIG. 10, each rivet 760 can also constitute a suitably displaced or depressed portion of the radially extending wall 709 of the housing section 704. Each displaced portion of the wall 709 is received in a complementary socket or recess at the adjacent side of the wall 704a.

The left-hand frustoconical surface of the wall 704a defines with the adjacent portion of the wall 709 an intermediate space 761 having a substantially wedge-shaped cross-sectional outline. The space 761 contains at least one fluid flow regulating valve 742 which is mounted on the wall 704a, and this space communicates with the second compartment of the chamber within the housing including the section 704. It can be said that the space 761 constitutes an extension of the second compartment.

The radially outermost portion of the wall 704a can be provided with an annularly arranged set of lugs, prongs or other protuberances which are anchored in the adjacent cylindrical portion of the housing section 704. Alternatively, the prongs, tongues or other protuberances can be provided at the inner side of the housing section 704. In either event, the prongs of the wall 704a and/or of the housing section 704 are distributed in such a way that they establish adequate paths for the flow of fluid from the second compartment of the housing into the space 761 or from the major part of the second compartment into the smaller part or space 761. The feature that the wall 704a is in engagement with the adjacent portion of the housing section 704 ensures that the wall 704a is highly unlikely to undergo any, or any appreciable, deformation which could result in undesirable axial shifting of the piston 717 under the action of axial forces generated by the fluid flowing from the passages 725 into one or more channels and thence into the first compartment.

The friction surface of the piston 717 is provided on a frustoconical portion 730 which is adjacent the friction surface of the friction lining 722 on the wall 704a. When the lockup clutch 715 is engaged, fluid coolant can flow from the space 761 into the valve or valves 742 and thence into the passages 725. These passages are provided in the friction lining 722. The valve 742 of FIG. 10 is or can be identical with the valve 542 of FIGS. 8a and 9 or with the valve 642 of FIG. 9a.

Figure 11:
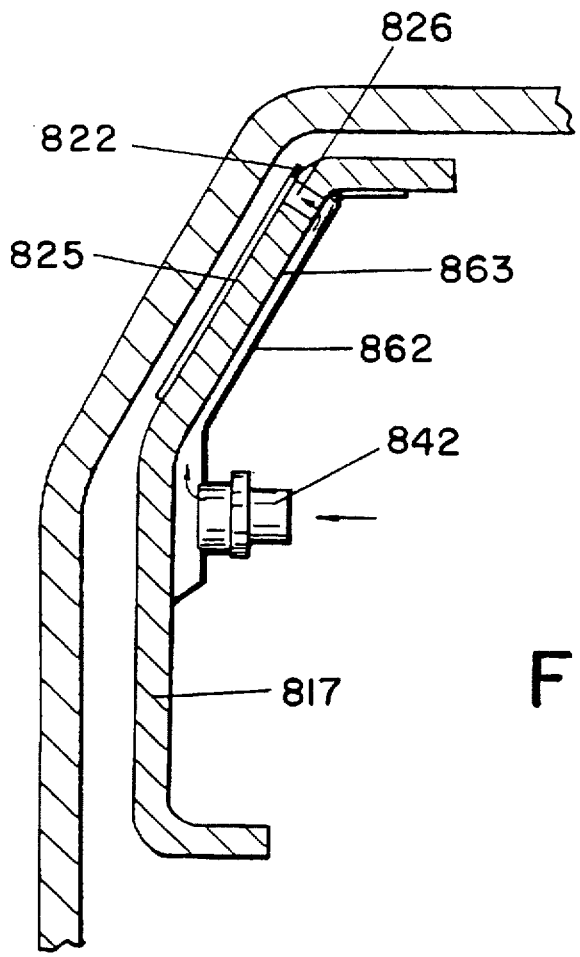
FIG. 11 is a fragmentary axial sectional view of still another hydrokinetic torque converter and its lockup clutch.

FIG. 11 shows a portion of still another hydrokinetic torque converter having a lockup clutch including a piston 817. A frustoconical portion of the piston 817 carries a friction lining 822 having passages 825 with inlets in communication with substantially axially parallel holes or bores 826 machined into or otherwise formed in the piston. A single valve 842 (corresponding to one of the valves described with reference to FIGS. 8a, 9 and 9a) suffices to regulate the fluid pressure at the inlets of a plurality of identical or different passages 825 in the friction surface of the lining 822. To this end, the outlet of the valve 842 discharges fluid into an annular space 863 between the right-hand side of the piston 817 and the left-hand side of a member 862 which is carried by the piston. The inlets of the passages 825 communicate with the annular space 863 by way of the respective bores or holes 826 in the piston 817. FIG. 11 shows that the valve 842 is installed radially inwardly of the bores or holes 826, i.e., the fluid which enters the space 863 between the member 862 and the piston 817 must flow radially outwardly on its way into the inlets of the passages 825.

It is clear that the torque converter embodying the structure of FIG. 11 can comprise two or more suitably distributed valves 842. Nevertheless, the provision of the member 862 and of the space 863 for fluid flowing toward the passages 825 renders it possible to construct the lockup clutch in such a way that the number of valves 842 is less than the number of passages 825.

The just-discussed feature of the torque converter and lockup clutch embodying the structure of FIG. 11 can be relied upon in connection with the construction of the torque converter 3 and lockup clutch 15 shown in FIG. 1. Thus, a fluid flow regulating valve (such as the valve 542 or 642 of 742 or 842) can be installed on the piston 17 to supply fluid coolant to the illustrated inlet 26a. Such inlet can supply fluid coolant to all of the passages 25 in the friction lining 22.

It is desirable to construct and install the valve or valves 542, 642, 742 or 842 in such a way that the influence of centrifugal forces on the regulating action of the valves is minimal, negligible or nil. This can be readily achieved by utilizing relatively small and lightweight plungers in the bodies of the valves. The inertia of a lightweight plunger, especially a small or very small plunger, is sufficiently small to ensure that the position of the plunger in its cylindrical chamber is not influenced, or is not unduly influenced, by the centrifugal force which develops when the housing of the torque converter is in actual use. An additional undertaking involves such positioning of the axis of the plunger in the valve 542, 642, 742 or 842 that it is substantially parallel to the axis of the housing of the torque converter. This, too, reduces the likelihood that the axial position of the plunger would change in response to the varying magnitude of centrifugal forces when the housing of the torque converter is rotated by a combustion engine or another prime mover. The lightweight plunger can be made of a suitable metallic material (such as aluminum) or of a suitable plastic material. The placing of the valve or valves as close to the axis of the housing as possible also contributes to a reduction of the influence of centrifugal forces upon the plunger. This can be seen in FIG. 11 wherein the valve 842 is installed radially inwardly of the friction lining 822 on the piston 817.

The valve or valves of the type described with reference to FIGS. 8a, 9, 9a and 10 render it possible to regulate the rate of fluid flow between the first and second compartments in such a way that the rate of fluid flow is not proportional to the square root of the difference between the pressures of fluid coolant in the first and second compartments.

Hydrokinetic torque converters of the type disclosed in U.S. Pat. No. 4,969,543 to Macdonald exhibit the drawback that the rate of fluid flow between the two compartments in the engaged condition of the lockup clutch is overly dependent upon the RPM of the housing of the torque converter. Thus, the rate of fluid flow is reduced considerably in response to increasing RPM of the housing. This is attributable to the aforediscussed dynamic or kinetic influences upon the conveyed fluid. Any undesirable and/or uncontrollable influences upon the rate of fluid flow are highly undesirable because they could alter the axial position of the piston (and hence the maximum value of the torque transmittable by the lockup clutch) at a most inopportune time or stage of operation of the torque converter. It has been found that the influence of changes of the RPM of the housing upon the lockup clutch which embodies the present invention is negligible, and this is attributed to the aforediscussed feature that the fluid leaving the passages between the friction surfaces of the lockup clutch is caused to flow at least substantially radially inwardly on its way into the first compartment. It is now possible to ensure that, at a given system pressure in the torque converter, the rate of fluid flow is low when the RPM of the housing of the torque converter is low; this renders it possible to employ a smaller and simpler pump.

Figure 12:
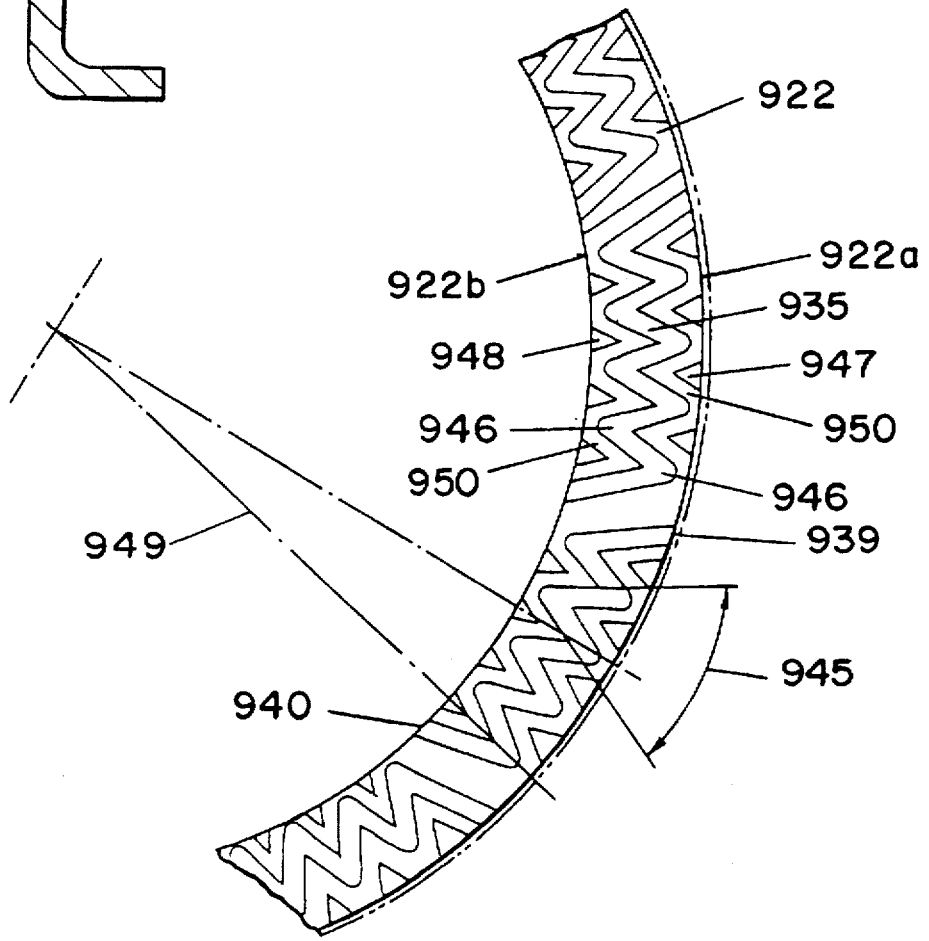
FIG. 12 is a fragmentary elevational view of a friction lining constituting a modification of the friction linings shown in FIGS. 6 and 7.

FIG. 12 shows a portion of a ring-shaped or washer-like friction lining 922 having a friction surface which is provided with meandering (e.g., zig-zag shaped or sinusoidal or snake-like) passages 935. In their entirety, the passages 935 extend in the circumferential direction of the friction lining 922. The configuration of the passages 935 is somewhat similar to that of the passages 435 in the friction linings shown in FIGS. 6, 7 and 8. The width of the passages 935 is at least substantially constant from the inlet to the outlet of each passage. Furthermore the cross-sectional outlines of the passages 935 are preferably constant or at least substantially constant from end to end.

A difference between the passages 935 in the friction lining 922 of FIG. 12 and the passages 435 of the friction lining 422 is that each passage 922 is open at the radially outer portion 922a as well as at the radially inner portion 922b of the friction lining 922.

The passages 935 can be impressed into or otherwise formed in the friction surface of the friction lining 922 during the making of the friction lining, e.g., during the punching or stamping out of a larger blank. In other words, the passages 935 can be provided in the friction lining 922 before the latter is bonded to a piston or to another part of the improved lockup clutch. However, it is equally possible to impress or to otherwise form the passages 935 during or subsequent to attachment of the friction lining 922 to the piston or to another component or member of the lockup clutch. Irrespective of whether the passages 935 are formed prior to, during or subsequent to attachment of the friction lining 922 to its carrier or support, such passages can be formed by simply displacing some material at the friction surface of the friction lining and/or by removing material from selected portions of the friction surface. The same applies for all other types of friction linings which are or which should be utilized in the improved lockup clutch.

It has been found that the rate of fluid flow in the passages 935 of the friction lining 922 is particularly satisfactory if each turn 946 or the single turn of a passage is flanked by two substantially or nearly straight elongated portions or legs making an angle 945 of between 30° and 120°, preferably between 45° and 70°. The angle 945 which is shown in FIG. 12 equals or approximates 45°. Furthermore, each passage 935 extending between the radially outer portion 939 and the radially inner portion 940 of the friction lining 922 is preferably configurated and/or oriented and/or dimensioned in such a way that a turbulent flow of liquid coolant develops at the inlet and/or at the outlet (preferably at the inlet as well as at the outlet) of each passage. It is advisable to select the shape, the orientation and the dimensions of each passage 935 (or at least a certain number of passages 935) in such a way that a turbulent fluid flow is established all the way from the inlet to the outlet of the respective passage. This enhances the transfer of heat between such passage or passages and the adjacent components of the lockup clutch when the torque converter employing the lockup clutch is in use. For example, a turbulent flow of fluid in the passages 935 can be established and maintained as a result of appropriate shaping of the turns 946 of the respective passages.

The feature that the passages 935 are rather close to each other and that each such passage extends all the way or at least substantially all the way between the radially outer portion 939 and the radially inner portion 940 of the friction lining 922 also contributes to more satisfactory removal of heat from the friction lining as well as from the adjacent components of the lockup clutch. The combined length of all passages 935 in the friction lining 922 can be selected with a view to ensure a relatively high or a relatively low rate of withdrawal of heat from the neighboring components of the lockup clutch.

In order to achieve a desirable and predictable turbulence of the fluid coolant in the passages 935, it is necessary or advisable to take into consideration the pressure differential between the inlets (at the outer portion 939) and the outlets (at the inner portion 940) of the passages. In a lockup clutch, such pressure differential corresponds to that of the pressure differential between the bodies of fluid coolant in the first and second compartments of the housing forming part of the respective torque converter, e.g., between the compartments 18 and 20 of the chamber 14 in the housing 2 of the torque converter 3 shown in FIG. 1.

The withdrawal of heat from the friction lining 922 as well as from the adjoining components of the lockup clutch employing such friction lining can be further enhanced by providing the radially outer portion 939 and/or the radially inner portion 940 of the friction lining of FIG. 12 with pockets 947 and 948 which can be obtained by depressing the corresponding portions of the friction surface and/or by removing material from such portions of the friction surface. As a rule, the pockets 947, 948 will be formed at the time of making the friction lining 922 or at the time of making the passages 935, and preferably by resorting to the same procedure as that which is being resorted to for the making of the passages 935.

The pockets 947 and 948 which are shown in FIG. 12 are triangular notches in the respective marginal portions of the friction lining 922. The illustrated pockets can be used jointly with or replaced by sickle-shaped, semicircular and/or otherwise configurated pockets. Still further, and as indicated by two radii 949 of curvature of the friction lining 922, the inner pockets 948 need not be aligned with the outer pockets 947. FIG. 12 shows that the pockets 947 alternate with the pockets 948, as seen in the circumferential direction of the friction lining 922. Of course, it is also possible to shape the friction surface of the friction lining in such a way that at least some of the pockets 947 are in radial alignment with at least some of the pockets 948, that individual pockets 947 alternate with pairs or larger groups of pockets 948 (as seen in the circumferential direction of the friction lining 922), to provide pockets only in the radially outer portion 939 or to provide pockets only in the radially inner portion 940.

FIG. 12 also shows that the illustrated inner pockets 948 alternate with the radially inner turns 946 and that the radially outer pockets 947 alternate with radially outer turns of the passages 935. When the friction lining 922 is rotated by a piston or another component of the lockup clutch, the pockets 947 and 948 contain bodies of turbulent fluid or at least some of these pockets are filled with turbulent fluid. This, too, enhances the withdrawal of heat by the fluid coolant.

Still further, FIG. 12 shows that at least the majority of the pockets 947 and 948 are in at least partial radial alignment with the adjoining passages 935. The provision of the passages 935 and pockets 947 and 948 in the friction surface 950 of the friction lining 922 causes the remaining, intact portion of the friction surface 950 to assume a substantially zig-zag shaped or a similar meandering, sinusoidal or snake-like configuration.

The depth of passages 935 in the friction surface 950 of the friction lining 922 or in the friction surface of a friction lining of the type shown in FIGS. 6 to 8 can match or at least approximate the thickness of the respective friction lining. For example, the depth of passages 435 or 935 can be such that they extend from the friction surface all the way to the other surface of the respective friction lining. This can be readily achieved if the passages are formed subsequent to bonding of the friction linings to the corresponding components of a lockup clutch. Furthermore, the passages 435 in the friction lining 422 of FIG. 6 can be readily provided in the friction surface prior to bonding of the friction lining to a piston or to another part of a lockup clutch because these passages do not extend all the way to the radially inner portion 422b or to the radially outer portion 422a of the friction lining 422. In other words, the passages 435 do not divide the respective friction lining into a plurality of short arcuate sections. For example, the passages can be punched out from the blank of the respective friction lining. The same holds true for the pockets 947 and 948 of the friction lining 922.

The provision of substantially meandering (such as zig-zag shaped) passages is desirable and advantageous for several reasons, for example, because the path or paths for the flow of liquid coolant in the friction surface of the friction lining are lengthened as well as because the fluid is caused to repeatedly flow back and forth between the radially inner and the radially outer portions of the friction lining. It has been found that it is advisable to provide each passage 435 or 935 with at least two turns (such as the turns 946 shown in FIG. 12) and preferably with four or more turns.

An advantage of one-piece friction linings (such as 422 and 922) is that they can be readily converted into hollow frustoconical bodies which can be bonded to the frustoconical surface of a piston, housing or other component of the lockup clutch in a simple and time-saving manner. On the other hand, a friction lining which is assembled of two or more arcuate sections (such as the friction lining sections 438 shown in FIG. 7) exhibits the advantage that the sections can be punched out or otherwise separated from a large sheet-like blank of friction lining material with a minimum of waste. As already mentioned above, one side of the blank which is to be converted into friction linings 422 or 922, or into friction lining sections 438, can be provided with a film of adhesive-coated material; this facilitates the manipulation of the friction linings prior and during bonding to the pistons or other components of lockup clutches. The provision of such films is particularly advantageous if the passages are of the type shown in FIG. 12, i.e., when the making of passages 935 involves the breaking up of a substantially circular blank into a number of arcuate portions each of which is provided with a passage 935 and a number of pockets 947 and 948.

Friction linings 422 of the type shown in FIG. 6 are preferred in many instances because the making of passages 435 does not involve or entail a subdivision of an arcuate blank into a set of discrete arcuate portions or sections. This is particularly advantageous in connection with bonding of such a friction lining to a piston or the like. Thus, a one-piece friction lining is more likely to be bonded to a component of a lockup clutch in such a way that its passages and pockets (if any) are distributed and oriented in a manner to ensure highly satisfactory flow of fluid coolant along the friction surfaces of the lockup clutch.

It is further within the purview of the invention to provide suitably distributed passages (e.g., of the type shown in FIGS. 6 to 8 or in FIG. 12) in a component other than the friction lining of a lockup clutch. For example, such passages can be machined into the friction surface 21 of the wall 9 shown in FIG. 1, and the passages in the friction surface 21 can be provided in addition to or in lieu of the passages 25 in the friction lining 22 on the piston 17. If the wall 9 is provided with a set of suitably distributed passages, they are or can be machined in the friction surface 21 by removing material from the housing section 4 in a suitable machine tool or in any other known manner.

Figure 11A:
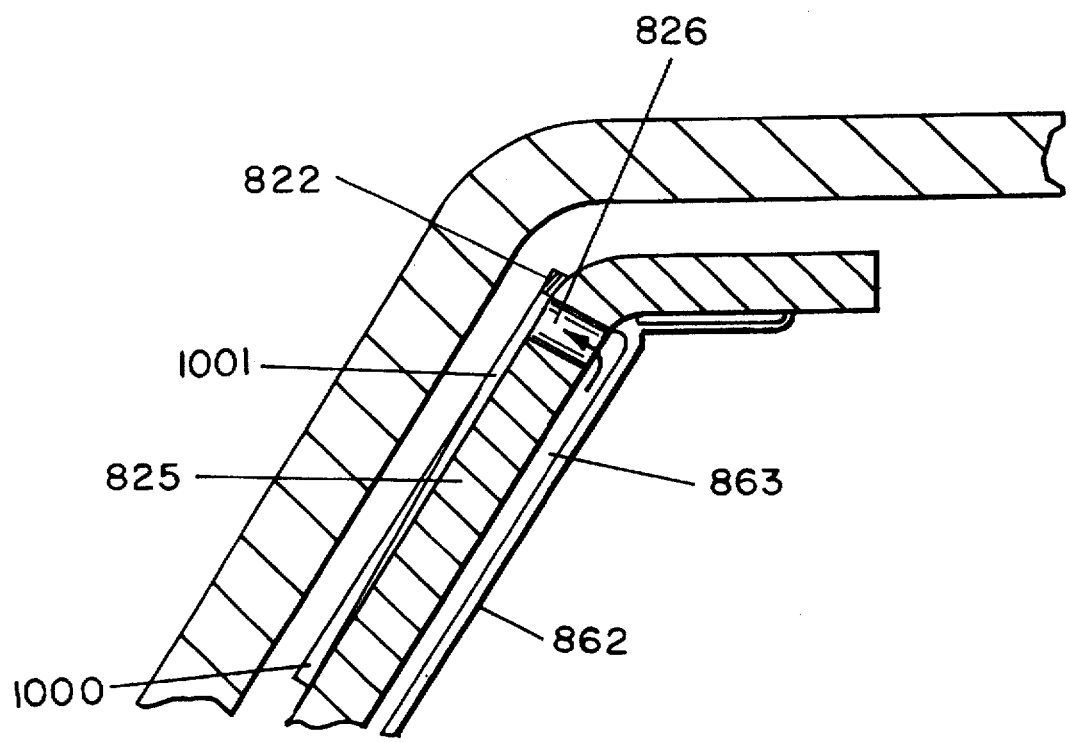
FIG. 11a shows a modification of the structure which is illustrated in FIG. 11.

In accordance with one presently preferred embodiment of the invention, the ratio of the thickness of a friction lining (such as 22) to the depth of the passages (such as 25) therein can be in the range of between 1.3 and 2.7. As used therein, the term depth is intended to denote the average depth of a passage in the friction lining. The actual depth of a passage (such as 25, 435 or 935) can be in the range of between 0.2 mm and 0.8 mm, preferably between 0.3 mm and 0.6 mm. As a rule, or at least in many instances, the depth of a passage will be constant from end to end, for example, because the flow of fluid therein is more predictable and also for convenience of mass production of friction linings. However, it can happen that, in certain hydrokinetic torque converters, the piston or another component of the lockup clutch will be configurated in such a way that the width and/or depth of its passages varies in or counter to the direction of fluid flow therein. FIG. 11a shows the structure of FIG. 11 with a passage 1000 of varying depth provided in the friction lining 822. The character 1001 denotes a portion of the friction lining 822 adjacent the passage 1000.

The resort to zig-zag shaped or similar passages in the friction surface of a friction lining or in the friction surface of another component of the improved lockup clutch automatically entails at least some throttling of the fluid flow from the inlet toward the outlet of such passage. Referring again to FIGS. 6 to 8 and 12, the length of each straight portion of a passage 435 or 935 can be in the range of between 10 mm and 40 mm, and the width of such passages can be between 3 mm and 10 mm.

In order to ensure that the rate of fluid flow in the passages of a friction lining or in the friction surface other than that of a friction lining will at most equal or approximate ten liters per minute (such rate has been found to be quite satisfactory for adequate cooling of selected parts of a lockup clutch which is constructed and operated in accordance with the present invention), and assuming that the fluid pressure at that side of the piston which faces the turbine of the torque converter is to be in the range of 5 bar, the depth of the passages (such as 435) can equal or approximate 3 mm. The overall number of zig-zag shaped or similar passages in a friction lining or in a part other than a friction lining of the improved lockup clutch is preferably not less than four and need not exceed twelve. It is preferred to ensure at least substantially uniform distribution of passages in the entire friction surface, be it that of a friction lining or of another component of the lockup clutch. The spacing between two neighboring turns (such as 946 in the friction lining 922 of FIG. 12) at the radially outer portion (922a) and/or at the radially inner portion (922b) of the friction surface in relation to the width of that portion of a friction surface (950) which is provided with passages can be in the range of between 0.6 and 1.3, preferably between 0.8 and 1.1.

The depth of the pockets 947 and/or 948 can match or at least approximate the depth of the respective passages (935 in FIG. 12). However, it is equally possible, and often preferred, to provide a friction lining with pockets which extend all the way between the two sides of the friction lining, even if the depth of the passages is less than the thickness of the friction lining because the making of such pockets is simpler than the making of pockets extending from the friction surface toward but short of the other surface of the friction lining.

The ratio of that area of the friction surface of a friction lining which remains intact upon completion of the making of passages to the remaining area of the friction lining is preferably between about 0.7 and 1.8, most preferably between 1 and 1.5. Thus, and referring to the friction lining 922 of FIG. 12, the ratio of that portion of the friction surface 950 which has been removed to form the passages 935 (with or without the portion which has been removed to form the pockets 947 and 948) to the area of the remaining part of the friction surface 950 is preferably within the aforementioned range. This has been found to be quite satisfactory to ensure adequate cooling of the friction lining and of the neighboring parts of the improved lockup clutch without overheating of the fluid coolant.

The improved cooling action of the fluid which can enter the pockets (such as 947 and/or 948) of a friction lining (such as 922) is attributable to the establishment of a so-called drag flow which develops along the radially inner and radially outer portions of a rotating friction lining. It has been found that the cooling effect of pockets in the one and/or the other marginal portion of a rotating friction lining is particularly satisfactory if the radially outer inlet portion of a pocket trails the radially outer outlet portion of the pocket, as seen in the direction of rotation of the friction lining. The cooling action upon the friction lining and upon the neighboring parts of the improved lockup clutch can be further enhanced by orienting the passages in its friction surface in such a way that the fluid coolant therein flow in the same direction as the aforementioned drag flows along the marginal portions when the friction lining is caused to rotate about the axis of the housing forming part of the hydrokinetic torque converter embodying the improved lockup clutch. The drag flow along the marginal portions of a rotating friction lining which is bonded to the piston of the lockup clutch or to a member (such as the member 24 in FIG. 1) which rotates with the piston is caused by that constituent of the lockup clutch which carries the other friction surface. With reference to the embodiment of FIG. 1, the aforementioned constituent is the wall 9 of the housing section 4.

When the two friction surfaces of the lockup clutch are free to slide relative to each other while the lockup clutch transmits torque from the housing to the turbine of the torque converter, the RPM of the housing exceeds the RPM of the friction lining if the latter is provided on the piston or on a member which shares all angular movements of the piston. Therefore, the friction surface of the housing accelerates the fluid in the passages of the adjacent friction lining. It has been found that the accelerating action of the housing (such as the housing 2 in FIG. 1) upon the fluid in the passages of the friction lining (such as the passages 25 in the friction lining 22 of FIG. 1) is greatly reduced or does not develop at all if the passages are dimensioned, oriented and distributed in a manner as described with reference to the illustrated embodiments of the present invention. Thus, the influence of the RPM of the housing of the torque converter upon the magnitude of torque which can be transmitted by the lockup clutch is negligible (especially when compared to the influence of the housing upon the friction lining of a conventional lockup clutch) or nil. The situation is analogous if the friction lining is carried by the housing and its friction surface confronts the friction surface of a metallic piston. Still further, the same advantages or similar advantages can be achieved if the passages are provided directly in the friction surface (such as 21) of a housing (such as 2) or in the friction surface of a metallic pressure plate (such as the piston 17 without the friction lining 22). This, in turn, renders it possible to employ a friction lining without any passages therein. For example, if the passages 25 are provided in the housing 2 of FIG. 1 instead of in the friction lining 22, such friction lining can be replaced with a friction lining having an uninterrupted friction surface free of passages and/or pockets, or a friction surface provided with pockets and/or passages whose distribution does not correspond to that shown in FIG. 6, 7 or 12. Even though some turbulence in the fluid streams flowing in the passages in a distribution as described hereinbefore will or can develop due to the establishment of a pressure differential between the fluid bodies in the first and second compartments when the torque converter is in use, such turbulence can be enhanced (with attendant improvement of the heat withdrawing action of the fluid) if the passages in a friction lining or in the friction surface of a metallic part (such as the housing 2 or the piston 17 of the structure shown in FIG. 1) are dimensioned, oriented and distributed in a manner as described, for example, with reference to FIGS. 6, 7 and 12. In other words, it is possible to select the configuration, the dimensions and/or the orientation of the passages for the express purpose of ensuring that, in addition to other important advantages, the passages ensure the development of pronounced turbulence at the inlet, at the outlet or along the full length of each passage or of a certain number of passages.

The provision of one or more valves of the type shown in and described with reference to FIGS. 8a, 9, 9a, 10 and 11 constitutes an optional but highly desirable and advantageous feature of the improved lockup clutch and of the torque converter embodying such lockup clutch. The flow regulating action of each such valve can be influenced by one or more variable parameters of the fluid coolant, of the lockup clutch, of the torque converter, of the prime mover for the housing of the torque converter and/or of the unit or units receiving torque from the turbine of the torque converter. For example, the only variable parameter or one of the variable parameters which can influence the rate of fluid flow through one or more valves can constitute the temperature of the fluid coolant, the RPM of the prime mover, the RPM of the turbine (i.e., the RPM of the rotary input element of a unit, such as a transmission, receiving torque from the torque converter) and/or particularly the pressure differential between the bodies of fluid in the first and second compartments. The valve or valves can regulate the rate of fluid flow between the two friction surfaces of the lockup clutch in such a way that, when the lockup clutch is engaged, the rate of fluid flow between the two friction surfaces is at least substantially constant within the entire operating range of the torque converter. However, and as already discussed hereinbefore, it is also possible to select the rate of fluid flow in such a way that it is a function of the extent of slippage of the two friction surfaces relative to each other in the engaged condition of the lockup clutch. This is tantamount to a regulation of the rate of fluid flow depending upon the amount of additional heat which develops as a result of slippage of the two friction surfaces relative to each other. Highly satisfactory results can be achieved by employing one or more valves which regulate the rate of fluid flow depending upon the variations of pressure differential between the bodies of fluid coolant in the first and second compartments.

The valve or valves can be installed at the inlets or at the outlets of the passages or at the inlet(s) of the channel(s) serving to receive fluid from the passages. Still further, it is possible to install the valves in the passages between the inlets and the outlets of the respective passages.

Still further, it is possible to employ solenoid operated valves in lieu of the valves which are shown in FIGS. 8a, 9, 9a, 10 and 11.

The improved hydrokinetic torque converter and its lockup clutch are susceptible of numerous additional modifications without departing from the spirit of the present invention. For example, certain features of the illustrated and described embodiments of the novel torque converter and/or of its lockup clutch can be combined or interchanged. In addition, numerous features of the aforedescribed torque converter and of its lockup clutch are believed to constitute patentable innovations even if they are embodied in conventional torque converters and/or lockup clutches. This applies, for example, to the making and configuration and utilization of the aforedescribed friction linings and their passages, to the utilization of the aforediscussed fluid flow regulating valves or analogous flow regulating means in conjunction with or without the friction linings, and to the construction and mounting of the piston and certain other components and/or members of the lockup clutch. Last but not least, it is within the scope of the invention to construct and assemble a power train, including a prime mover (such as a combustion engine in a motor vehicle), one or more driven units (e.g., a transmission or a differential in a motor vehicle) and the improved lockup clutch or bypass clutch in combination with the improved torque converter or with a conventional torque converter to arrive at a patentable power train.

The disclosures of all of the aforementioned U.S. patents, commonly owned pending U.S. patent applications and U.S. patents granted or about to be granted on the commonly owned U.S. patent applications are incorporated herein by reference.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above-outlined contribution to the art and, therefore, such adaptations should and are intended to be comprehended within the meaning and range of equivalence of the appended claims.

What is claimed is:

1. A hydrokinetic torque converter comprising a housing having a fluid-containing chamber and being rotatable about a predetermined axis; a pump, a turbine and a stator in said chamber; and an engageable and disengageable lockup clutch interposed between said housing and said turbine and comprising a piston movable in said chamber in the direction of said axis and dividing said chamber into a first compartment disposed at a first radial distance from said axis and a second compartment, a first friction surface carried by said piston at a second radial distance from said axis greater than said first distance, a second friction surface carried by a component rotatable with said housing, said first friction surface confronting and being in contact with said second friction surface in the engaged condition of said clutch, at least one of said piston and said component having at least one passage provided at least in part in a friction lining of said at least one of said piston and said component for the flow of fluid from said second compartment substantially radially inwardly toward said first compartment, first and second members defining at least one channel which establishes a path for the flow of fluid from said at least one passage into said first compartment and wherein the fluid acts upon said members in the direction of said axis, and means for preventing axial movements of said piston in the direction of said axis in response to the action of fluid in said at least one channel.

2. The torque converter of claim 1, wherein said piston has a width as measured radially of said axis and said at least one channel extends at least substantially along the full width of said piston.

3. The torque converter of claim 1, wherein said means for preventing is disposed in the region of a hub of said turbine.

4. The torque converter of claim 1, wherein said first friction surface is provided on said friction lining.

5. The torque converter of claim 1, wherein one of said members forms part of said piston.

6. The torque converter of claim 1, wherein one of said members includes one of said piston and said component.

7. The torque converter of claim 1, wherein said means for preventing includes means for connecting said members to each other.

8. The torque converter of claim 1, wherein one of said members bounds a portion of said first compartment and is affixed to one of said piston and said component, said at least one channel being provided in said one member.

9. The torque converter of claim 1, wherein one of said members is rigid with one of said piston and said component.

10. The torque converter of claim 1, wherein said component includes a wall forming part of said housing and extending substantially radially of said axis, said first compartment being disposed between said wall and said piston as seen in the direction of said axis.

11. The torque converter of claim 1, wherein said housing includes a wall and said piston is an annular piston and is disposed between said wall and said turbine.

12. The torque converter of claim 1, wherein one of said members forms part of said piston and said at least one channel is provided in said piston.

13. The torque converter of claim 1, wherein one of said members is mounted on said piston.

14. The torque converter of claim 1, wherein one of said members is disposed in said first compartment.

15. The torque converter of claim 1, wherein said piston is disposed between one of said members and said first compartment.

16. The torque converter of claim 1, wherein said turbine and said pump are disposed in said second compartment.

17. The torque converter of claim 1, wherein said component is provided with a second friction lining.

18. The torque converter of claim 17, wherein said at least one passage is adjacent said second friction lining.

19. The torque converter of claim 1, wherein said at least one passage has an inlet at a first radial distance and an outlet at a second radial distance from said axis less than said first radial distance.

20. The torque converter of claim 1, wherein said first compartment has a predetermined width as measured radially of said axis and said at least one channel has a length as measured radially of said axis corresponding to at least 50 percent of said width, as seen in the direction of said axis.

21. The torque converter of claim 1, wherein said at least one passage is a cutout in said friction lining.

22. The torque converter of claim 1, wherein said at least one passage is stamped or embossed into said friction lining.

23. The torque converter of claim 1, wherein said at least one passage has an inlet extending in substantial parallelism with said axis.

24. The torque converter of claim 1, wherein said at least one passage has an outlet extending in substantial parallelism with said axis.

25. The torque converter of claim 1, wherein said at least one passage defines a substantially meandering or zig-zag shaped path for the flow of fluid between said at least one channel and said second compartment.

26. The torque converter of claim 1, wherein said friction lining has a first portion disposed at a first radial distance and a second portion disposed at a second radial distance from said axis, said second radial distance being greater than said first radial distance and said at least one passage having an inlet at one of said first and second portions of said friction lining and an outlet at the other of said first and second portions of said friction lining.

27. The torque converter of claim 1, wherein said piston is an annular piston and said friction lining extends substantially circumferentially of said annular piston, said at least one passage extending substantially circumferentially of said piston and defining a meandering or zig-zag shaped path for the flow of fluid between said at least one channel and said second compartment.

28. The torque converter of claim 1, wherein said at least one passage establishes a substantially zig-zag shaped or meandering path for the flow of fluid between said at least one channel and said second compartment, said path having at least two turns.

29. The torque converter of claim 1, wherein said first friction surface is provided on said friction lining.

30. The torque converter of claim 1, wherein said friction lining is provided with said first friction surface, said friction lining having at least two arcuate sections.

31. The torque converter of claim 1, wherein said lockup clutch further comprises means for regulating the flow of fluid in said at least one passage as a function of variations of at least one variable parameter of the torque converter.

32. The torque converter of claim 1, further comprising means for rotating said housing, said lockup clutch further comprising means for regulating the flow of fluid in said at least one passage as a function of variations of a variable parameter of said rotating means.

33. The torque converter of claim 1, further comprising means for receiving torque from said turbine, said lockup clutch further comprising means for regulating the flow of fluid in said at least one passage as a function of a variable parameter of said torque receiving means.

34. The torque converter of claim 1, further comprising means for driving said housing and means for receiving torque from said turbine, said lockup clutch further comprising means for regulating the flow of fluid in said at least one passage as a function of variations of a variable parameter of at least one of said torque converter, said driving means and said torque receiving means.

35. The torque converter of claim 34, wherein said at least one passage includes an inlet portion and an outlet portion and said regulating means comprises an adjustable valve at one of said inlet and outlet portions.

36. The torque converter of claim 1, wherein said at least one passage is defined by a shaped portion of at least one of said piston and said component.

37. The torque converter of claim 1, wherein said housing comprises a wall constituting said component and said at least one passage is defined by a shaped portion of said wall.

38. The torque converter of claim 1, wherein said piston is an annular piston and said at least one passage is defined by a shaped portion of said annular piston.

39. The torque converter of claim 1, wherein the pressure of fluid in said first compartment differs from the pressure of fluid in said second compartment during at least one stage of operation of the torque converter, said lockup clutch further comprising means for regulating the rate of fluid flow through said at least one passage as a function of differences between the fluid pressures in said compartments.

40. The torque converter of claim 39, wherein said regulating means comprises at least one valve including means for reducing the rate of fluid flow in said at least one passage in response to increasing differences between the fluid pressures in said first and second compartments.

41. The torque converter of claim 39, wherein said flow regulating means comprises at least one valve which is acted upon by centrifugal force in response to rotation of at least one of said component and said piston, said at least one valve comprising means for varying the rate of fluid flow in said at least one passage as a function of changes of differences between fluid pressures in said compartments and at least substantially independently of the action of centrifugal force.

42. The torque converter of claim 39, wherein said regulating means comprises a valve having means for varying the fluid flow in said at least one passage at a rate which is different from a square root of the difference between fluid pressures in said first and second compartments.

43. A hydrokinetic torque converter comprising a housing having a fluid-containing chamber and being rotatable about a predetermined axis; a pump, a turbine and a stator in said chamber; and an engageable and disengageable lockup clutch interposed between said housing and said turbine and comprising a piston having a width as measured radially of said axis, said piston being movable in said chamber in the direction of said axis and dividing said chamber into a first compartment disposed at a first radial distance from said axis and a second compartment, a first friction surface carried by said piston at a second radial distance from said axis greater than said first distance, a second friction surface carried by a component rotatable with said housing, said first friction surface confronting and being in contact with said second friction surface in the engaged condition of said clutch, at least one of said piston and said component having at least one passage for the flow of fluid from said second compartment substantially radially inwardly toward said first compartment, first and second members defining at least one channel which extends at least substantially along the full radial width of said piston and establishes a path for the flow of fluid from said at least one passage into said first compartment and wherein the fluid acts upon said members in the direction of said axis, and means for preventing axial movements of said piston in the direction of said axis in response to the action of fluid in said at least one channel.

44. The torque converter of claim 43, wherein said means for preventing is disposed in the region of a hub of said turbine.

45. A hydrokinetic torque converter comprising a housing having a fluid-containing chamber and being rotatable about a predetermined axis; a pump, a turbine and a stator in said chamber; and an engageable and disengageable lockup clutch interposed between said housing and said turbine and comprising a piston movable in said chamber in the direction of said axis and dividing said chamber into a first compartment disposed at a first radial distance from said axis and a second compartment, a first friction surface carried by said piston at a second radial distance from said axis greater than said first distance, a second friction surface carried by a component rotatable with said housing, said first friction surface confronting and being in contact with said second friction surface in the engaged condition of said clutch, at least one of said piston and said component having at least one passage for the flow of fluid from said second compartment substantially radially inwardly toward said first compartment, first and second members defining at least one channel which establishes a path for the flow of fluid from said at least one passage into said compartment and wherein the fluid acts upon said members in the direction of said axis, and means for preventing axial movements of said piston in the direction of said axis in response to the action of fluid in said at least one channel, said means for preventing being disposed in the region of a hub of said turbine.

46. A hydrokinetic torque converter comprising a housing having a fluid-containing chamber and being rotatable about a predetermined axis; a pump, a turbine and a stator in said chamber; and an engageable and disengageable lockup clutch interposed between said housing and said turbine and comprising a piston having a width as measured radially of said axis, provided with a friction lining and movable in said chamber in the direction of said axis and dividing said chamber into a first compartment disposed at a first radial distance from said axis and a second compartment, a first friction surface carried by said piston at a second radial distance from said axis greater than said first distance, a second friction surface carried by a component rotatable with said housing, said first friction surface confronting and being in contact with said second friction surface in the engaged condition of said clutch, said piston having at least one passage provided at least in part in said friction lining for the flow of fluid from said second compartment substantially radially inwardly toward said first compartment, first and second members defining at least one channel which extends at least substantially along the full radial width of said piston and establishes a path for the flow of fluid from said at least one passage into said first compartment and wherein the fluid acts upon said members in the direction of said axis, and means for preventing axial movements of said piston in the direction of said axis in response to the action of fluid in said at least one channel, said means for preventing being disposed in the region of a hub of said turbine.

47. A hydrokinetic torque converter comprising a housing having a fluid-containing chamber and being rotatable about a predetermined axis; a pump, a turbine and a stator in said chamber; and an engageable and disengageable lockup clutch interposed between said housing and said turbine and comprising an annular piston movable in said chamber in the direction of said axis and dividing said chamber into a first compartment and a second compartment, a first friction surface provided on at least one friction lining of said piston, a second friction surface carried by a component which is rotatable with said housing, said first friction surface confronting and being in contact with said second friction surface in the engaged condition of the clutch, said friction surfaces being disposed at a first radial distance and said first compartment being disposed at a second radial distance from said axis, said second radial distance being less than said first radial distance and at least one of said piston and said component having at least one passage provided at least in part in said at least one friction lining for the flow of fluid from said second compartment toward said first compartment in the engaged condition of said clutch, said at least one passage being disposed at said first radial distance from said axis, a wall disposed in said first compartment, extending substantially radially of said axis and defining with a second wall at least one channel which establishes a path for the flow of fluid from said at least one passage into said first compartment, and means for connecting said walls to each other against movement relative to one another in the direction of said axis, said second wall extending at least substantially radially of said axis.

48. The torque converter of claim 47, wherein said second wall forms part of said piston.

49. The torque converter of claim 47, wherein said piston has a width as measured radially of said axis and said at least one channel extends at least substantially along the full radial width of said piston.

50. The torque converter of claim 47, wherein said connecting means is disposed in the region of a hub of said turbine.

51. A hydrokinetic torque converter comprising a housing having a fluid-containing chamber and being rotatable about a predetermined axis; a pump, a turbine and a stator in said chamber; and an engageable and disengageable lockup clutch interposed between said housing and said turbine and comprising an annular piston having a width as measured radially of said axis, said piston being movable in said chamber in the direction of said axis and dividing said chamber into a first compartment and a second compartment, a first friction surface provided on at least one friction lining of said piston, a second friction surface carried by a component which is rotatable with said housing, said first friction surface confronting and being in contact with said second friction surface in the engaged condition of said clutch, said friction surfaces being disposed at a first radial distance and said first compartment being disposed at a second radial distance from said axis, said second radial distance being less than said first radial distance and at least one of said piston and said component having at least one passage for the flow of fluid from said second compartment toward said first compartment in the engaged condition of said clutch, said at least one passage being disposed at said first radial distance from said axis, a wall disposed in said first compartment, extending substantially radially of said axis and defining with a second wall at least one channel which extends at least substantially along the full radial width of said piston and establishes a path for the flow of fluid from said at least one passage into said first compartment, and means for connecting said walls to each other against movement relative to one another in the direction of said axis, said second wall extending at least substantially radially of said axis.

52. The torque converter of claim 51, wherein said connecting means is disposed in the region of a hub of said turbine.

53. A hydrokinetic torque converter comprising a housing having a fluid-containing chamber and being rotatable about a predetermined axis; a pump, a turbine and a stator in said chamber; and an engageable and disengageable lockup clutch interposed between said housing and said turbine and comprising an annular piston movable in said chamber in the direction of said axis and dividing said chamber into a first compartment and a second compartment, a first friction surface provided on at least one friction lining of said piston, a second friction surface carried by a component which is rotatable with said housing, said first friction surface confronting and being in contact with said second friction surface in the engaged condition of said clutch, said friction surfaces being disposed at a first radial distance and said first compartment being disposed at a second radial distance from said axis less than said first radial distance, at least one of said piston and said component having at least one passage for the flow of fluid from said second compartment toward said first compartment in the engaged condition of said clutch, said at least one passage being disposed at said first radial distance from said axis, a wall disposed in said first compartment, extending substantially radially of said axis and defining with a second wall at least one channel which establishes a path for the flow of fluid from said at least one passage into said first compartment, and means for connecting said walls to each other against movement relative to one another in the direction of said axis, said second wall extending at least substantially radially of said axis and said means for connecting being disposed in the region of a hub of said turbine.

54. A hydrokinetic torque converter comprising a housing having a fluid-containing chamber and being rotatable about a predetermined axis; a pump, a turbine and a stator in said chamber; and an engageable and disengageable lockup clutch interposed between said housing and said turbine and comprising an annular piston having a width as measured radially of said axis and movable in said chamber in the direction of said axis and dividing said chamber into a first compartment and a second compartment, a first friction surface provided on at least one friction lining of said piston, a second friction surface carried by a component which is rotatable with said housing, said first friction surface confronting and being in contact with said second friction surface in the engaged condition of the clutch, said friction surfaces being disposed at a first radial distance and said first compartment being disposed at a second radial distance from said axis less than said first radial distance, said piston having at least one passage provided at least in part in said at least one friction lining for the flow of fluid from said second compartment toward said first compartment in the engaged condition of said clutch, said at least one passage being disposed at said first radial distance from said axis, a wall disposed in said first compartment, extending substantially radially of said axis and defining with a second wall at least one channel which extends at least substantially along the full radial width of said piston and establishes a path for the flow of fluid from said at least one passage into said first compartment, and means for connecting said walls to each other against movement relative to one another in the direction of said axis, said second wall extending at least substantially radially of said axis and said means for connecting being disposed in the region of a hub of said turbine.

55. A hydrokinetic torque converter comprising a housing having a fluid-containing chamber and being rotatable about a predetermined axis; a pump, a turbine and a stator in said chamber; and an engageable and disengageable lockup clutch interposed between said housing and said turbine and comprising a piston movable in said chamber in the direction of said axis and dividing said chamber into a first compartment disposed at a first radial distance from said axis and a second compartment, a first friction surface carried by said piston at a second radial distance from said axis greater than said first radial distance, a second friction surface carried by a component rotatable with said housing, said first friction surface confronting and being in contact with said second friction surface in the engaged condition of said clutch, a least one of said piston and said component having at least one passage for the flow of fluid from said second compartment substantially radially inwardly toward said first compartment, first and second members defining at least one channel which establishes a path for the flow of fluid from said at least one passage into said first compartment and wherein the fluid acts upon said members in the direction of said axis, one of said members dividing said first compartment into two sections which are adjacent each other as seen in the direction of said axis, and means for preventing axial movements of said piston in the direction of said axis in response to the action of fluid in said at least one channel.

56. A hydrokinetic torque converter comprising a housing having a fluid-containing chamber and being rotatable about a predetermined axis; a pump, a turbine and a stator in said chamber; and an engageable and disengageable lockup clutch interposed between said housing and said turbine and comprising a piston movable in said chamber in the direction of said axis and dividing said chamber into a first compartment disposed at a first radial distance from said axis and a second compartment, a first friction surface carried by said piston at a second radial distance from said axis greater than said first radial distance, a second friction surface carried by a component rotatable with said housing, said first friction surface confronting and being in contact with said second friction surface in the engaged condition of said clutch, at least one of said piston and said component having at least one passage for the flow of fluid from said second compartment substantially radially inwardly toward said first compartment, first and second members defining at least one channel which establishes a path for the flow of fluid from said at least one passage into said first compartment and wherein the fluid acts upon said members in the direction of said axis, means for preventing axial movements of said piston in the direction of said axis in response to the action of fluid in said at least one channel, and at least one valve including means for regulating the flow of fluid through said at least one passage so that the rate of fluid flow through said at least one passage is at least substantially constant within the entire operating range of the torque converter.

57. A hydrokinetic torque converter comprising a housing having a fluid-containing chamber and being rotatable about a predetermined axis; a pump, a turbine and a stator in said chamber; and an engageable and disengageable lockup clutch interposed between said housing and said turbine and comprising an annular piston movable in said chamber in the direction of said axis and dividing said chamber into a first compartment and a second compartment, a first friction surface provided on at least one friction lining of said piston, a second friction surface carried by a component which is rotatable with said housing, said first friction surface confronting and being in contact with said second friction surface in the engaged condition of the clutch, said friction surfaces being disposed at a first radial distance and said first compartment being disposed at a second radial distance from said axis less than said first radial distance, at least one of said piston and said component having at least one passage for the flow of fluid from said second compartment toward said first compartment in the engaged condition of said clutch, said at least one passage being disposed at said first radial distance from said axis, a first wall disposed in said first compartment, extending substantially radially of said axis and defining with a second wall at least one channel which establishes a path for the flow of fluid from said at least one passage into said first compartment, means for connecting said walls to each other against movement relative to one another in the direction of said axis, said second wall extending at least substantially radially of said axis, and means for connecting said first wall to said housing against movement relative to the housing in the direction of said axis.

58. A hydrokinetic torque converter comprising a housing having a fluid-containing chamber and being rotatable about a predetermined axis, a pump, a turbine having a hub, and a stator in said chamber; and an engageable and disengageable lockup clutch interposed between said housing and said turbine and comprising an annular piston movable in said chamber in the direction of said axis and dividing said chamber into a first compartment and a second compartment, a first friction surface provided on at least one friction lining of said piston, a second friction surface carried by a component which is rotatable with said housing, said first friction surface confronting and being in contact with said second friction surface in the engaged condition of the clutch, said friction surfaces being disposed at a first radial distance and said first compartment being disposed at a second radial distance from said axis less than said first radial distance, at least one of said piston and said component having at least one passage for the flow of fluid from said second compartment toward said first compartment in the engaged condition of said clutch, said at least one passage being disposed at said first radial distance from said axis, a first wall disposed in said first compartment, extending substantially radially of said axis and defining with a second wall at least one channel which establishes a path for the flow of fluid from said at least one passage into said first compartment, means for connecting said first wall to said hub so that the first wall is held against movement relative to the turbine in the direction of said axis, and means for connecting said walls to each other against movement relative to one another in the direction of said axis, said second wall extending at least substantially radially of said axis.

59. A lockup clutch for a hydrokinetic torque converter, comprising an annular component rotatable about a predetermined axis; a friction lining carried by said component and having an annular friction surface disposed at a predetermined radial distance from said axis; liquid coolant conveying passages provided in said component and in said friction surface of said friction lining at said predetermined radial distance from said axis; and at least one valve having means for varying the effective cross-sectional areas of said passages to thus regulate a volumetric rate of the flow of coolant in said passages as a function of at least one operational parameter.

60. The lockup clutch of claim 59, wherein at least one of said passages is at least substantially zig-zag shaped.

61. The lockup clutch of claim 59, wherein at least one of said passages has a plurality of portions extending substantially radially of said axis and at least two turns.

62. The lockup clutch of claim 61, wherein said friction surface is a conical surface.

63. The lockup clutch of claim 59, wherein at least one of said passages is a cutout in and/or is impressed into said friction lining.

64. The lockup clutch of claim 63, wherein said at least one passage is a stamping in said friction lining.

65. The lockup clutch of claim 63, wherein said friction lining includes a radially inner circumferentially complete portion and a radially outer circumferentially complete portion, said at least one passage being disposed between said circumferentially complete portions.

66. The lockup clutch of claim 59, wherein said passages are elongated and at least one thereof has a substantially constant cross-section.

67. The lockup clutch of claim 59, wherein said passages are at least substantially uniformly distributed in a circumferential direction of said friction surface.

68. The lockup clutch of claim 59, wherein at least one of said passages has at least two turns spaced apart from each other a distance, as seen in a circumferential direction of said annular component, which is between about 0.6 and 1.3 times the width of said at least one passage, as seen in a direction radially of said axis.

69. The lockup clutch of claim 68, wherein said distance is between 0.8 and 1.1 times the width of said at least one passage.

70. The lockup clutch of claim 59, wherein at least one of said passages is elongated and has a depth which varies in the longitudinal direction thereof.

71. The lockup clutch of claim 59, wherein at least one of said passages is elongated and has a width which varies in the longitudinal direction thereof.

72. The lockup clutch of claim 59, wherein at least one of said passages is elongated and has an inlet and an outlet, said inlet and said outlet extending substantially radially of said axis.

73. The lockup clutch of claim 59, wherein said friction lining has a first annular portion at a first radial distance from said axis, a second annular portion at a second radial distance from said axis, and pockets provided in at least one of said annular portions, said second radial distance being different from said first radial distance.

74. The lockup clutch of claim 73, wherein said pockets are open in directions substantially radially of said axis.

75. The lockup clutch of claim 73, wherein at least one of said passages has a plurality of turns alternating with said pockets as seen in a circumferential direction of said annular component.

76. The lockup clutch of claim 59, wherein said component is rotatable in a predetermined direction, at least one of said passages having an inlet disposed at a first radial distance from said axis and an outlet disposed at a second radial distance from said axis, said second radial distance being less than said first radial distance and said outlet being located behind said inlet as seen in said predetermined direction.

77. The lockup clutch of claim 59, wherein at least one of said passages has two portions inclined relative to and making with each other an angle of between 30° and 120°.

78. The lockup clutch of claim 77, wherein said angle is between 45° and 70°.

79. The lockup clutch of claim 77, wherein said angle is about 60°.

80. The lockup clutch of claim 59, wherein said friction lining has a thickness which is between 1.3 and 2.7 times an average depth of at least one of said passages, said at least one passage being provided in said friction lining.

81. The lockup clutch of claim 59, wherein at least one of said passages has a depth of between 0.2 and 0.8 mm.

82. The lockup clutch of claim 81, wherein said depth is between 0.3 and 0.6 mm.

83. The lockup clutch of claim 59, wherein said component is rotatable by an engine of a motor vehicle and at least one of said passages is alongated and has an inlet and an outlet, said at least one passage being configured to establish at least at one of said inlet and said outlet a substantially turbulent flow of fluid when the vehicle is in use.

84. The lockup clutch of claim 59, wherein said passages are provided in said friction surface of said friction lining, said passages jointly taking up a first portion of said friction surface and said friction surface having a second portion which is devoid of passages, the ratio of said first and second portions being between 0.7 and 1.8.

85. The lockup clutch of claim 84, wherein said ratio is between 1 and 1.5.

86. A hydrokinetic torque converter comprising an engageable and disengageable lockup clutch including an annular piston; at least one first friction surface carried by said piston; a second friction surface complementary to said at least one first friction surface; and passages provided at at least one of said first and second friction surfaces to establish at least one path for the flow of a liquid coolant, said path having a zig-zag shaped configuration in a circumferential direction of said piston.

87. The hydrokinetic torque converter of claim 86, wherein at least one of said passages has a plurality of portions extending substantially radially of an axis of said piston and at least two turns.

88. The hydrokinetic torque converter of claim 86, wherein said friction surfaces are conical surfaces and at least one of said passages is provided in one of said friction surfaces.

89. The hydrokinetic torque converter of claim 86, wherein at least one of said friction surfaces is provided on a friction lining and at least one of said passages is a cutout in and/or is impressed into said friction lining.

90. The hydrokinetic torque converter of claim 89, wherein said at least one passage is a stamping in said friction lining.

91. The hydrokinetic torque converter of claim 89, wherein said friction lining includes a radially inner circumferentially complete portion and a radially outer circumferentially complete portion, said at least one passage being disposed between said circumferentially complete portions.

92. The hydrokinetic torque converter of claim 86, wherein said passages are elongated and at least one thereof has a substantially constant cross-section.

93. The hydrokinetic torque converter of claim 86, wherein said passages are at least substantially uniformly distributed in a circumferential direction of said friction surfaces.

94. The hydrokinetic torque converter of claim 86, wherein at least one of said passages has at least two turns spaced apart from each other a distance, as seen in a circumferential direction of said annular piston, which is between about 0.6 and 1.3 times the width of at least one of said passages, as seen in a direction radially of an axis of said piston.

95. The hydrokinetic torque converter of claim 94, wherein said distance is between 0.8 and 1.1 times the width of said at least one passage.

96. The hydrokinetic torque converter of claim 86, wherein at least one of said passages is elongated and has a depth which varies in the longitudinal direction thereof.

97. The hydrokinetic torque converter of claim 86, wherein at least one of said passages is elongated and has a width which varies in the longitudinal direction thereof.

98. The hydrokinetic torque converter of claim 86, wherein at least one of said passages is elongated and has an inlet and an outlet, said inlet and said outlet extending substantially radially of an axis of said piston.

99. The hydrokinetic torque converter of claim 86, wherein said piston has a first annular portion at a first radial distance from an axis of said piston, a second annular portion at a second radial distance from said axis, and pockets provided in at least one of said annular portions, said second radial distance being different from said first radial distance.

100. The hydrokinetic torque converter of claim 99, wherein said pockets are open in a direction substantially radially of said axis.

101. The hydrokinetic torque converter of claim 99, wherein at least one of said passages has a plurality of turns alternating with said pockets as seen in a circumferential direction of said annular piston.

102. The hydrokinetic torque converter of claim 86, wherein said piston is rotatable in a predetermined direction, at least one of said passages having an inlet disposed at a first radial distance from an axis of said piston and an outlet disposed at a second radial distance from said axis, said second radial distance being less than said first radial distance and said outlet being located behind said inlet as seen in said predetermined direction.

103. The hydrokinetic torque converter of claim 86, wherein at least one of said passages has two portions inclined relative to and making with each other an angle of between 30° and 120°.

104. The hydrokinetic torque converter of claim 103, wherein said angle is between 45° and 70°.

105. The hydrokinetic torque converter of claim 103, wherein said angle is about 60°.

106. The hydrokinetic torque converter of claim 86, wherein said piston is provided with a friction lining having a thickness which is between 1.3 and 2.7 times an average depth of at least one of said passages, said at least one passage being provided in said friction lining.

107. The hydrokinetic torque converter of claim 86, wherein at least one of said passages has a depth of between 0.2 and 0.8 mm.

108. The hydrokinetic torque converter of claim 107, wherein said depth is between 0.3 and 0.6 mm.

109. The hydrokinetic torque converter of claim 86, wherein said piston is rotatable by an engine of a motor vehicle and at least one of said passages is elongated and has an inlet and an outlet, said at least one passage being configured to establish at least at one of said inlet and said outlet a substantially turbulent flow of liquid coolant when the vehicle is in use.

110. The hydrokinetic torque converter of claim 86, wherein said passages are provided in at least one of said friction surfaces, said passages jointly taking up a first portion of the respective friction surface and the latter having a second portion which is devoid of passages, the ratio of said first and second portions being between 0.7 and 1.8.

111. The hydrokinetic torque converter of claim 110, wherein said ratio is between 1 and 1.5.

112. A hydrokinetic torque converter comprising an engageable and disengageable lockup clutch having at least one annular friction lining defining at least one friction surface and having at said friction surface zig-zag shaped passages extending in a circumferential direction of said at least one annular friction lining.

113. The hydrokinetic torque converter of claim 112, wherein at least one of said passages has a plurality of portions extending substantially radially of an axis of said clutch and at least two turns.

114. The hydrokinetic torque converter of claim 112, wherein said at least one friction surface is a conical surface and at least one of said passages is provided in said at least one friction surface.

115. The hydrokinetic torque converter of claim 112, wherein at least one of said passages is a cutout in and/or is impressed into said at least one friction lining.

116. The hydrokinetic torque converter of claim 115, wherein said at least one passage is a stamping in said at least one friction lining.

117. The hydrokinetic torque converter of claim 112, wherein said at least one friction lining includes a radially inner circumferentially complete portion and a radially outer circumferentially complete portion, at least one of said passages being disposed between said circumferentially complete portions.

118. The hydrokinetic torque converter of claim 112, wherein said passages are elongated and at least one thereof has a substantially constant cross-section.

119. The hydrokinetic torque converter of claim 112, wherein said passages are at least substantially uniformly distributed in a circumferential direction of said at least one friction surface.

120. The hydrokinetic torque converter of claim 112, wherein at least one of said passages has at least two turns spaced apart from each other a distance, as seen in a circumferential direction of said at least one annular friction lining, which is between about 0.6 and 1.3 times the width of said at least one passage, as seen in a direction radially of an axis of said clutch.

121. The hydrokinetic torque converter of claim 120, wherein said distance is between 0.8 and 1.1 times the width of said at least one passage.

122. The hydrokinetic torque converter of claim 112, wherein at least one of said passages is elongated and has a depth which varies in the longitudinal direction thereof.

123. The hydrokinetic torque converter of claim 112, wherein at least one of said passages is elongated and has a width which varies in the longitudinal direction thereof.

124. The hydrokinetic torque converter of claim 112, wherein at least one of said passages is elongated and has an inlet and an outlet, said inlet and said outlet extending substantially radially of an axis of said clutch.

125. A hydrokinetic torque converter for the transmission of torque between a prime mover which drives the torque converter and a transmission driven by the torque converter, comprising a housing having a fluid-containing chamber and being rotatable about a predetermined axis; a pump in said housing; a turbine in said housing; and an engageable and disengageable lockup clutch in said housing, said clutch having an annular piston dividing said chamber into a first compartment and a second compartment, at least one first friction surface provided on said piston and bearing against at least one complementary second friction surface of a clutch component in the engaged condition of the clutch, said friction surfaces being disposed at a predetermined radial distance from said axis and said piston and said component having passages disposed at said predetermined radial distance from said axis and establishing at least one path for the flow of fluid between said compartments in the engaged condition of the clutch, and at least one valve for regulating the flow of fluid along said at least one path as a function of at least one operational parameter of at least one of said torque converter, said prime mover and said transmission.

126. The hydrokinetic torque converter of claim 125, wherein at least one of said piston and said component has a first annular portion at a first radial distance from said axis, a second annular portion at a second radial distance from said axis, and pockets provided in at least one of said annular portions, said second radial distance being different from said first radial distance.

127. The hydrokinetic torque converter of claim 126, wherein said pockets are open in directions substantially radialy of said axis.

128. The hydrokinetic torque converter of claim 126, wherein at least one of said passages has a plurality of turns alternating with said pockets as seen in a circumferential direction of said annular piston.

129. The hydrokinetic torque converter of claim 125, wherein said housing is rotatable in a predetermined direction, at least one of said passages having an inlet disposed at a first radial distance from said axis and an outlet disposed at a second radial distance from said axis, said second radial distance being less than said first radial distance and said outlet being located behind said inlet as seen in said predetermined direction.

130. The hydrokinetic torque converter of claim 125, wherein at least one of said passages has two portions inclined relative to and making with each other an angle of between 30° and 120°.

131. The hydrokinetic torque converter of claim 130, wherein said angle is between 45° and 70°.

132. The hydrokinetic torque converter of claim 130, wherein said angle is about 60°.

133. The hydrokinetic torque converter of claim 125, wherein at least one of said piston and said component is provided with a friction lining having a thickness which is between 1.3 and 2.7 times an average depth of at least one of said passages, said at least one passage being provided in said friction lining.

134. The hydrokinetic torque converter of claim 125, wherein at least one of said passages has a depth of between 0.2 and 0.8 mm.

135. The hydrokinetic torque converter of claim 134, wherein said depth is between 0.3 and 0.6 mm.

136. The hydrokinetic torque converter of claim 125, wherein said housing is rotatable by an engine of a motor vehicle and at least one of said passages is elongated and has an inlet and an outlet, said at least one passage being configurated to establish at least at one of said inlet and said outlet a substantially turbulent flow of fluid when the vehicle is in use.

137. The hydrokinetic torque converter of claim 125, wherein said passages are provided in at least one of said friction surfaces, said passages jointly taking up a first portion of the respective friction surface and the latter having a second portion which is devoid of passages, the ratio of said first and second portions being between 0.7 and 1.8.

138. The hydrokinetic torque converter of claim 137, wherein said ratio is between 1 and 1.5.

139. The hydrokinetic torque converter of claim 125, wherein at least one of said passages has an at least substantially zig-zag shaped configuration.

140. A hydrokinetic torque converter comprising a housing defining a fluid-containing chamber and being rotatable about a predetermined axis; a pump in said housing; a turbine in said housing; and an engageable and disengageable lockup clutch in said housing, said clutch comprising an annular piston dividing said chamber into first and second compartments, at least one first conical friction surface carried by said piston, a component provided with at least one second conical friction surface complementary to and contacting said at least one first friction surface in the engaged condition of said clutch, said friction surfaces being disposed at a predetermined first radial distance from said axis and one of said compartments being disposed between said piston and said component at a second radial distance from said axis, said second radial distance being less than said first radial distance, and passages provided in at least one of said piston and said component at said first radial distance from said axis to establish a path for the flow of fluid from the other of said compartments toward said one compartment in the engaged condition of said clutch, at least one of said passages being at least substantially zig-zag shaped, at least one of said passages being provided in one of said friction surfaces, and at least one of said passages having a plurality of portions extending substantially radially of said axis and at least two turns.

141. A hydrokinetic torque converter comprising a housing defining a fluid-containing chamber and being rotatable about a predetermined axis; a pump in said housing; a turbine in said housing; and an engageable and disengageable lockup clutch in said housing, said clutch comprising an annular piston dividing said chamber into first and second compartments, at least one first conical friction surface carried by said piston, a component provided with at least one second conical friction surface complementary to and contacting said at least one first friction surface in the engaged condition of said clutch, at least one of said friction surfaces being provided on a friction lining and said friction surfaces being disposed at a predetermined first radial distance from said axis, one of said compartments being disposed between said piston and said component at a second radial distance from said axis and said second radial distance being less than said first radial distance, and passages provided in at least one of said piston and said component at said first radial distance from said axis to establish a path for the flow of fluid from the other of said compartments toward said one compartment in the engaged condition of said clutch, at least one of said passages being at least substantially zig-zag shaped and at least one of said passages being a cutout in and/or impressed into said friction lining.

142. The hydrokinetic torque converter of claim 141, wherein said at least one passage is a stamping in said friction lining.

143. The hydrokinetic torque converter of claim 141, wherein said friction lining includes a radially inner circumferentially complete portion and a radially outer circumferentially complete portion, said at least one passage being disposed between said circumferentially complete portions.

144. A hydrokinetic torque converter comprising a housing defining a fluid-containing chamber and being rotatable about a predetermined axis; a pump in said housing; a turbine in said housing; and an engageable and disengageable lockup clutch in said housing, said clutch comprising an annular piston dividing said chamber into first and second compartments, at least one first conical friction surface carried by said piston, a component provided with at least one second conical friction surface complementary to and contacting said at least one first friction surface in the engaged condition of said clutch, said friction surfaces being disposed at a predetermined first radial distance from sad axis and one of said compartments being disposed between said piston and said component at a second radial distance from said axis, said second radial distance being less than said first radial distance, and passages provided in at least one of said piston and said component at said first radial distance from said axis to establish a path for the flow of fluid from the other of said compartments toward said one compartment in the engaged condition of said clutch, at least one of said passages being at least substantially zig-zag shaped and at least one of said passages having at least two turns spaced apart from each other a distance, as seen in a circumferential direction of said piston, which is between about 0.6 and 1.3 times the width of said at least one passage, as seen in a direction radially of said axis.

145. The hydrokinetic torque converter of claim 144, wherein said distance is between 0.8 and 1.1 times the width of said at least one passage.

146. A hydrokinetic torque converter comprising a housing defining a fluid-containing chamber and being rotatable about a predetermined axis; a pump in said housing; a turbine in said housing; and an engageable and disengageable lockup clutch in said housing, said clutch comprising an annular piston dividing said chamber into first and second compartments, at least one first conical friction surface carried by said piston, a component provided with at least one second conical friction surface complementary to and contacting said at least one first friction surface in the engaged condition of said clutch, said friction surfaces being disposed at a predetermned first radial distance from said axis and one of said compartments being disposed between said piston and said component at a second radial distance from said axis, said second radial distance being less than said first radial distance, and passages provided in at least one of said piston and said component at said first radial distance from said axis to establish a path for the flow of fluid from the other of said compartments toward said one compartment in the engaged condition of said clutch, at least one of said passages being at least substantially zig-zag shaped and at least one of said passages being elongated and having a depth which varies in the longitudinal direction thereof.

147. A hydrokinetic torque converter comprising a housing defining a fluid-containing chamber and being rotatable about a predetermined axis; a pump in said housing; a turbine in said housing; and an engageable and disengageable lockup clutch in said housing, said clutch comprising an annular piston dividing said chamber into first and second compartments, at least one first conical friction surface carried by said pston, a component provided with at least one second conical friction surface complementary to and contacting said at least one first friction surface in the engaged condition of said clutch, said friction surfaces being disposed at a predetermined first radial distance from said axis and one of said compartments being disposed between said piston and said component at a second radial distance from said axis, said second radial distance being less than said first radial distance, and passages provided in at least one of said piston and said component at said first radial distance from said axis to establish a path for the flow of fluid from the other of said compartments toward said one compartment in the engaged condition of said clutch, at least one of said passages being at least substantially zig-zag shaped and at least one of said passages being elongated and having a width which varies in the longitudinal direction thereof.

148. A hydrokinetic torque converter comprising a housing defining a fluid-containing chamber and being rotatable about a predetermined axis; a pump in said housing; a turbine in said housing; and an engageable and disengageable lockup clutch in said housing, said clutch comprising an annular piston dividing said chamber into first and second compartments, at least one first conical friction surface carried by said piston, a component provided with at least one second conical friction surface complementary to and contacting said at least one first friction surface in the engaged condition of said clutch, said friction surfaces being disposed at a predetermined first radial distance from said axis and one of said compartments being disposed between said piston and said component at a second radial distance from said axis, said second radial distance being less than said first radial distance, and passages provided in at least one of said piston and said component at said first radial distance from said axis to establish a path for the flow of fluid from the other of said compartments toward said one compartment in the engaged condition of said clutch, at least one of said passages being at least substantially zig-zag shaped and at least one of said piston and said component having a first annular portion at a third radial distance from said axis, a second annular portion at a fourth radial distance from said axis, and pockets provided in at least one of said annular portions, said fourth radial distance being different from said third radial distance.

149. The hydrokinetic torque converter of claim 148, wherein said pockets are open in directions substantially radially of said axis.

150. The hydrokinetic torque converter of claim 148, wherein at least one of said passages has a plurality of turns alternating with said pockets as seen in a circumferential direction of said annular piston.

151. A hydrokinetic torque converter comprising a housing defining a fluid-containing chamber and being rotatable in a predetermined direction about a predetermined axis; a pump in said housing; a turbine in said housing; and an engageable and disengageable lockup clutch in said housing, said clutch comprising an annular piston dividing said chamber into first and second compartments, at least one first conical friction surface carried by said piston, a component provided with at least one second conical friction surface complementary to and contacting said at least one first friction surface in the engaged condition of said clutch, said friction surfaces being disposed at a predetermined first radial distance from said axis and one of said compartments being disposed between said piston and said component at a second radial distance from said axis, said second radial distance being less than said first radial distance, and passages provided in at least one of said piston and said component at said first radial distance from said axis to establish a path for the flow of fluid from the other of said compartments toward said one compartment in the engaged condition of said clutch, at least one of said passages being at least substantially zig-zag shaped and at least one of said passages having an inlet disposed at a third radial distance from said axis and an outlet disposed at a fourth radial distance from said axis, said fourth radial distance being less than said third radial distance and said outlet being located behind said inlet as seen in said predetermined direction.

152. A hydrokinetic torque converter comprising a housing defining a fluid-containing chamber and being rotatable about a predetermined axis; a pump in said housing; a turbine in said housing; and an engageable and disengageable lockup clutch in said housing, said clutch comprising an annular piston dividing said chamber into first and second compartments, at least one first conical friction surface carried by said piston, a component provided with at least one second conical friction surface complementary to and contacting said at least one first friction surface in the engaged condition of said clutch, said friction surfaces being disposed at a predetermined first radial distance from said axis and one of said compartments being disposed between said piston and said component at a second radial distance from said axis, said second radial distance being less than said first radial distance, and passages provided in at least one of said piston and said component at said first radial distance from said axis to establish a path for the flow of fluid from the other of said compartments toward said one compartment in the engaged condition of said clutch, at least one of said passages being at least substantially zig-zag shaped and at least one of said passages having two portions inclined relative to and making with each other an angle of between 45° and 70°.

153. The hyrokinetic torque converter of claim 152, wherein said angle is about 60°.

154. A hydrokinetic torque converter comprising a housing defining a fluid-containing chamber and being rotatable about a predetermined axis; a pump in said housing; a turbine in said housing; and an engageable and disengageable lockup clutch in said housing, said clutch comprising an annular piston dividing said chamber into first and second compartments, at least one first conical friction surface carried by said piston, a component provided with at least one second conical friction surface complementary to and contacting said first friction surface in the engaged condition of said clutch, said friction surfaces being disposed at a predetermined first radial distance from said axis and one of said compartments being disposed between said piston and said component at a second radial distance from said first axis, said second radial distance being less than said first radial distance, and passages provided in at least one of said piston and said component at said first radial distance from said axis to establish a path for the flow of fluid from the other of said compartments toward said one compartment in the engaged condition of said clutch, at least one of said piston and said component being provided with a friction lining having a thickness which is between 1.3 and 2.7 times an average depth of at least one of said passages, said at least one passage being provided in said friction lining and at least one of said passages being at least substantially zig-zag shaped.

155. A hydrokinetic torque converter comprising a housing defining a fluid-containing chamber and being rotatable about a predetermined axis; a pump in said housing; a turbine in said housing; and an engageable and disengageable lockup clutch in said housing, said clutch comprising an annular piston dividing said chamber into first and second compartments, at least one first conical friction surface carried by said piston, a component provided with at least one second conical friction surface complementary to and contacting said at least one first friction surface in the engaged condition of said clutch, said friction surfaces being disposed at a predetermined first radial distance from said axis and one of said compartments being disposed between said piston and said component at a second radial distance from said axis, said second radial distance being less than said first radial distance, and passages provided in at least one of said piston and said component at said first radial distance from said axis to establish a path for the flow of fluid from the other of said compartments toward said one compartment in the engaged condition of said clutch, said passages being provided in the at least one friction surface of said at least one of said piston and sad component and said passages jointly taking up a first portion of the respective at least one friction surface and the latter having a second portion which is devoid of passages, the ratio of said first and second portions being between 0.7 and 1.8 and at least one of said passages being at least substantially zig-zag shaped.

156. The hydrokinetic torque converter of claim 155, wherein said ratio is between 1 and 1.5.

* * * * *